(12) United States Patent
Komiya

(10) Patent No.: US 9,096,276 B2
(45) Date of Patent: Aug. 4, 2015

(54) FRONT SUBFRAME STRUCTURE OF AUTOMOBILE

(71) Applicant: MAZDA MOTOR CORPORATION, Hiroshima (JP)

(72) Inventor: Katsuyuki Komiya, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/385,082

(22) PCT Filed: Feb. 26, 2013

(86) PCT No.: PCT/JP2013/001119
§ 371 (c)(1),
(2) Date: Sep. 12, 2014

(87) PCT Pub. No.: WO2013/145549
PCT Pub. Date: Oct. 3, 2013

(65) Prior Publication Data
US 2015/0021115 A1    Jan. 22, 2015

(30) Foreign Application Priority Data

Mar. 26, 2012 (JP) .................................. 2012-068880

(51) Int. Cl.
*B62D 21/11* (2006.01)
*B62D 21/15* (2006.01)

(52) U.S. Cl.
CPC .............. *B62D 21/155* (2013.01); *B62D 21/11* (2013.01)

(58) Field of Classification Search
CPC ............................... B62D 21/11; B62D 21/155
See application file for complete search history.

(56) References Cited

U.S. PATENT DOCUMENTS

| 7,976,037 B2 * | 7/2011 | Yoshida et al. | ........ 280/124.109 |
| 2007/0024044 A1 * | 2/2007 | Ogawa et al. | ................. 280/788 |
| 2010/0231005 A1 * | 9/2010 | Yoshida et al. | .......... 296/203.02 |
| 2011/0062677 A1 * | 3/2011 | Kudla et al. | ............. 280/124.109 |
| 2014/0265442 A1 * | 9/2014 | Makino et al. | ............. 296/187.1 |
| 2014/0312654 A1 * | 10/2014 | Komiya et al. | .......... 296/187.09 |

FOREIGN PATENT DOCUMENTS

| JP | 2007-253642 A | 10/2007 |
| JP | 2009-061879 A | 3/2009 |
| JP | 2009-096371 A | 5/2009 |
| JP | 2010-064637 A | 3/2010 |

OTHER PUBLICATIONS

International Search Report; PCT/JP2013/001119; May 28, 2013.

* cited by examiner

*Primary Examiner* — Drew Brown
(74) *Attorney, Agent, or Firm* — Studebaker & Brackett PC

(57) ABSTRACT

A front subframe structure includes a pair of left and right side members extending in a vehicle front-rear direction, a center cross member of a closed cross-section structure extending in a vehicle-width direction to couple the a pair of left and right side members together, an inclined member having a pair of left and right inclined portions extending obliquely, in a plan view, outward in a vehicle-widthwise direction from a rear portion of a vehicle-widthwise middle portion of the center cross member, and a mount attaching portion of a powertrain mount housed in the center cross member and located behind a front edge of the center cross member and in front of a coupling portion between the inclined member and the center cross member.

10 Claims, 25 Drawing Sheets

FRONT SUBFRAME STRUCTURE OF AUTOMOBILE

TECHNICAL FIELD

The invention relates to a front subframe structure of an automobile, and particularly to a front subframe structure provided with an attaching portion for a powertrain mount.

BACKGROUND ART

Such a structure has been known that a powertrain mount for carrying a powertrain of an automobile is attached to a cross member of a front subframe (see following Patent Literature 1 and 2).

In Patent Literature 1, a suspension member (a cross member of a front subframe member) carrying a link (arm) of a suspension extends in a vehicle-width direction, and a rear damper (a mount for a powertrain) carrying an engine, i.e., a powertrain is attached to a lower surface of the suspension member through a bracket made of a metal plate.

Patent Literature 2 has disclosed a vehicle body suspension device provided with a front subframe including one pipe member having a U-shaped form in a plan view, a coupling member (cross member) coupling left and right side portions of the U-shaped pipe member, and transmitting means formed of two pipe members arranged in a V-shaped form in a plan view with respect to the U-shaped pipe member, and particularly configured to transfer a load applied from a suspension arm to a front subframe to an attaching portion arranged on a vehicle body member through the transmitting means and thereby increase an attaching rigidity of the suspension arm and to improve a torsion rigidity thereof.

In Patent Literature 2, an engine mount bracket carrying an engine is attached to an upper portion (upper surface) of the rear portion of the U-shape pipe member extending in a vehicle-width direction.

CITATION LIST

Patent Literature

Patent Literature 1: Japanese Patent Application Publication No. 2010-64637

Patent Literature 2: Japanese Patent Application Publication No. 2009-61879

The front subframe has been required to increase the rigidity of the front subframe itself for increasing a support rigidity (particularly, a rigidity to a vehicle-widthwise load during turning or the like) of the arm in an ordinary state. Further, in the structure having the powertrain mount to the cross member of the front subframe as disclosed in Patent Literature 1 and 2, there has been a need for compactly arranging the powertrain mount.

In Patent Literature 1, a rear damper is arranged under the cross member coupling left and right arm supports together. However, this results in a problem in that a large vertical space must be kept for arranging the cross member, the bracket and the rear damper vertically stacked together for layouts. Also, a path for transmitting loads applied from the left and right arms is formed along the cross member so that the applied loads may affect the rear damper, and consequently, it is practically difficult to arrange the rear damper under the cross member.

The conventional structure disclosed in Patent Literature 1, there is a room for further improvement in connection with compact arrangement of the powertrain mount.

In Patent Literature 2, the engine mount bracket is arranged above the rear portion of the U-shaped pipe member extending in the vehicle-width direction. This results in a problem in that a vertically large space must be kept for arranging the engine mount bracket. Similarly to Patent Literature 1, the conventional structure disclosed in Patent Literature 2 has a room for further improvement in compact arrangement of the powertrain mount.

SUMMARY OF INVENTION

Accordingly, an object of the invention is to provide a front subframe structure of an automobile that can increase a rigidity of a front subframe, and allows compact arrangement of a powertrain mount while preventing an influence of a load from affecting the powertrain mount.

A front subframe structure of an automobile of the invention includes: a pair of left and right side members extending in a vehicle front-rear direction; a cross member of a closed cross-section structure extending in a vehicle-width direction to couple the a pair of left and right side members together; an inclined member having a pair of left and right inclined portions extending obliquely, in a plan view, outward in a vehicle-widthwise direction and toward a rear of the vehicle from a rear portion of a vehicle-widthwise middle portion of the cross member; and an attaching portion of a powertrain mount housed in the cross member and located behind a front edge of the cross member and in front of a coupling portion between the inclined member and the cross member.

The invention achieves an effect of increasing a rigidity of the front subframe, and achieving compact arrangement of the powertrain mount while preventing application of an influence of a load to the powertrain mount.

The foregoing and other objects, features and advantages of the present invention will become more apparent from the following detailed description and the accompanying drawings.

DESCRIPTION OF EMBODIMENTS

In embodiments, an object of increasing a rigidity of a front subframe, and allowing compact arrangement of a powertrain mount while preventing an influence of a load from affecting the powertrain mount is achieved by a structure which includes: a pair of left and right side members extending in a vehicle front-rear direction; a cross member of a closed cross-section structure extending in a vehicle-width direction to couple the a pair of left and right side members together; an inclined member having a pair of left and right inclined portions extending obliquely, in a plan view, outward in a vehicle-widthwise direction and toward a rear of the vehicle from a rear portion of a vehicle-widthwise middle portion of the cross member; and an attaching portion of a powertrain mount housed in the cross member and located behind a front edge of the cross member and in front of a coupling portion between the inclined member and the cross member.

[First Embodiment]

A first embodiment of the invention will now be described with reference to the drawings.

Figure 1:
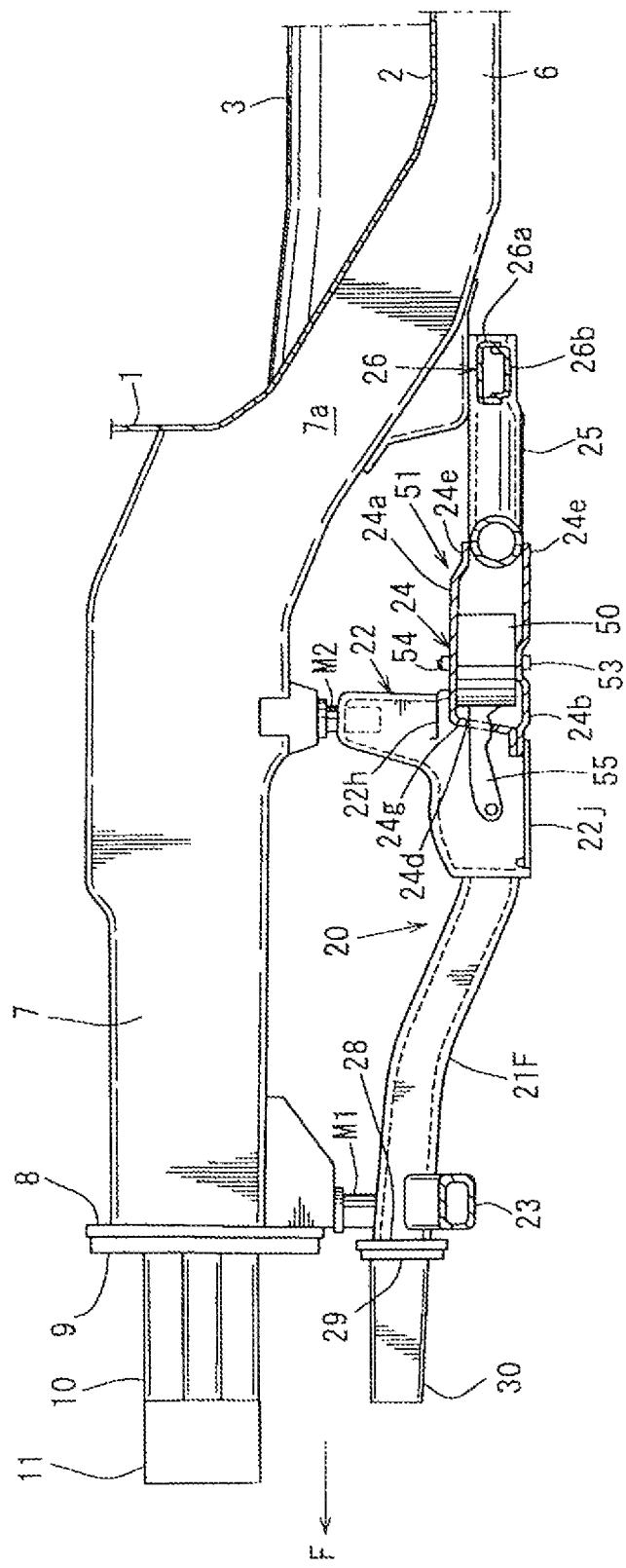
FIG. 1 is a side view illustrating a first embodiment of a front subframe structure of an automobile of the invention.
Figure 2:
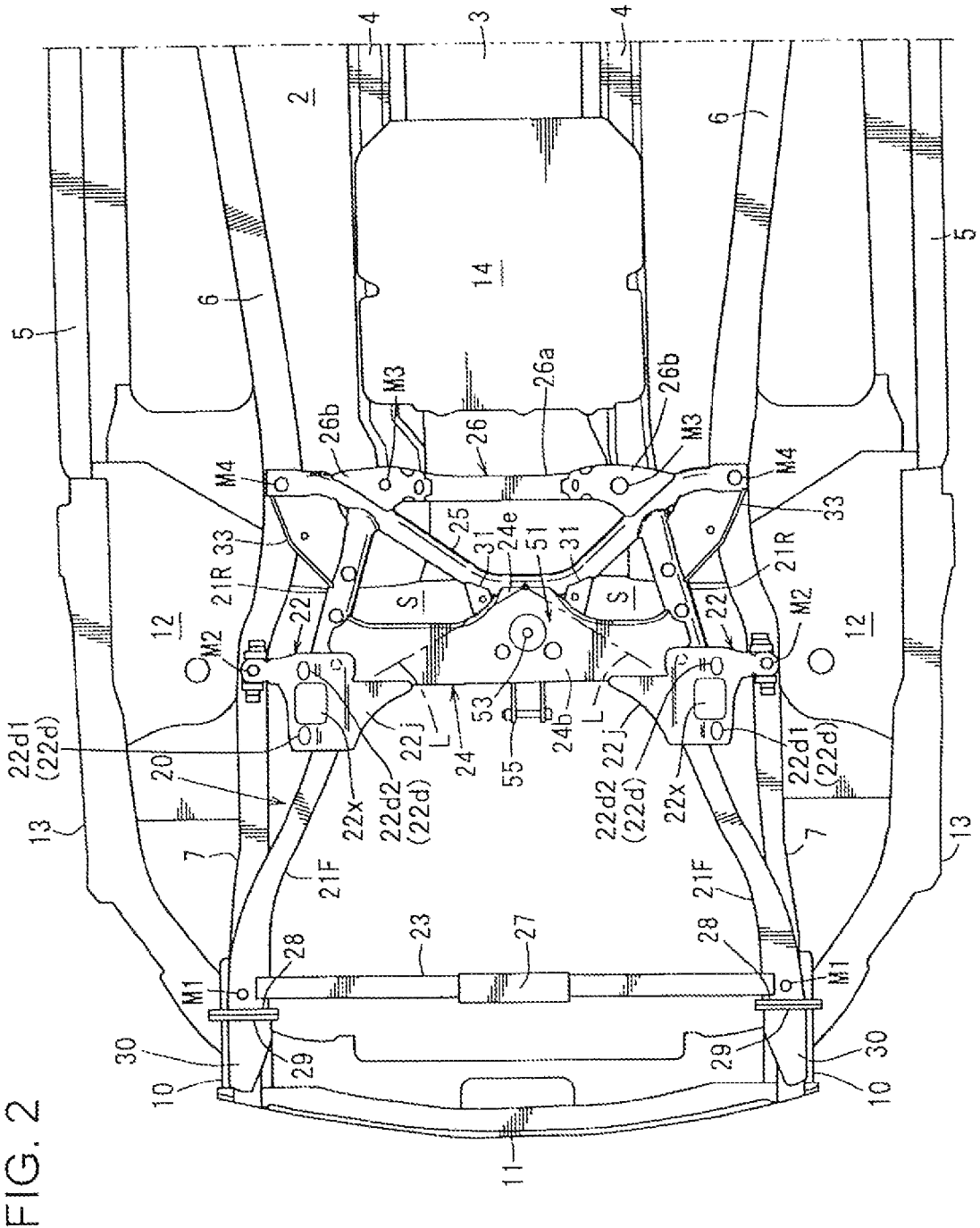
FIG. 2 is a bottom view of the front subframe structure.

FIG. 1 is a side view illustrating a front subframe structure of an automobile, and FIG. 2 is a bottom view of FIG. 1. In FIG. 1, a dash lower panel 1 (dash panel) is arranged to segment, in a front-rear direction of the vehicle, an engine room from a cabin behind the engine room, and a floor panel 2 is integrally or rigidly joined and fixed to a rear end of a lower portion of the dash lower panel 1.

The floor panel 2 is a panel member forming a bottom of the cabin, and extends horizontally and rearward from a lower rear end of the dash lower panel 1. The floor panel 2 is integrally or rigidly provided at its vehicle-widthwise middle portion with a tunnel 3 (floor tunnel) protruding into the cabin and extending in a front-rear direction of the vehicle.

As illustrated in a bottom view of FIG. 2, a pair of left and right tunnel members 4 in pair extending in the vehicle front-rear direction are arranged along a lower edge of the tunnel 3, and the tunnel members 4 each having a substantially hat-shaped cross section are joined and fixed to a lower surface of the floor panel 2 so that a closed cross-section space extending in the front-rear direction are formed between the floor panel 2 and the tunnel members 4, respectively.

A side sill 5 is joined and fixed to each of the left and right sides of the floor panel 2.

The side sill 5 is a vehicle body reinforcing member which joins the upper and lower joining flanges of a side sill inner and a side sill outer to provide a side sill closed cross-section space extending in the vehicle front-rear direction.

A floor frame 6 is arranged in a vehicle-widthwise intermediate position between each side sill 5 and the tunnel member 4.

The floor frame 6 has a substantially hat-shaped cross section, extends in the vehicle front-rear direction, and is fixedly joined to the lower surface of the floor panel 2 to form a closed cross-section space extending in the vehicle front-rear direction between the floor panel 2 and the floor frame 6.

As illustrated in FIGS. 1 and 2, there are arranged a pair of left and right front side frames 7 each having a closed cross-section structure and extending forward from a front surface of the dash lower panel 1 through the left or right side of the engine room.

The front side frame 7 is integrally provided at its rear portion with a kick-up portion 7a along the front and lower surface portions of the dash lower panel 1, and continues to the floor frame 6 in the vehicle front-rear direction.

As illustrated in FIG. 1, a crash can 10 is connected to a front end of each of the pair of left and right front side frames 7 through flanges 8 and 9. As illustrated in FIGS. 1 and 2, a bumper reinforcement 11 extending in the vehicle-width direction is arranged between the front ends of the pair of left and right crash cans 10.

In FIG. 2, 12 indicates a suspension tower, 13 indicates an apron reinforcement, 14 indicates a tunnel cross member of a plate-like form coupling, in the vehicle-width direction, the pair of left and right tunnel members 4 together.

Figure 3:
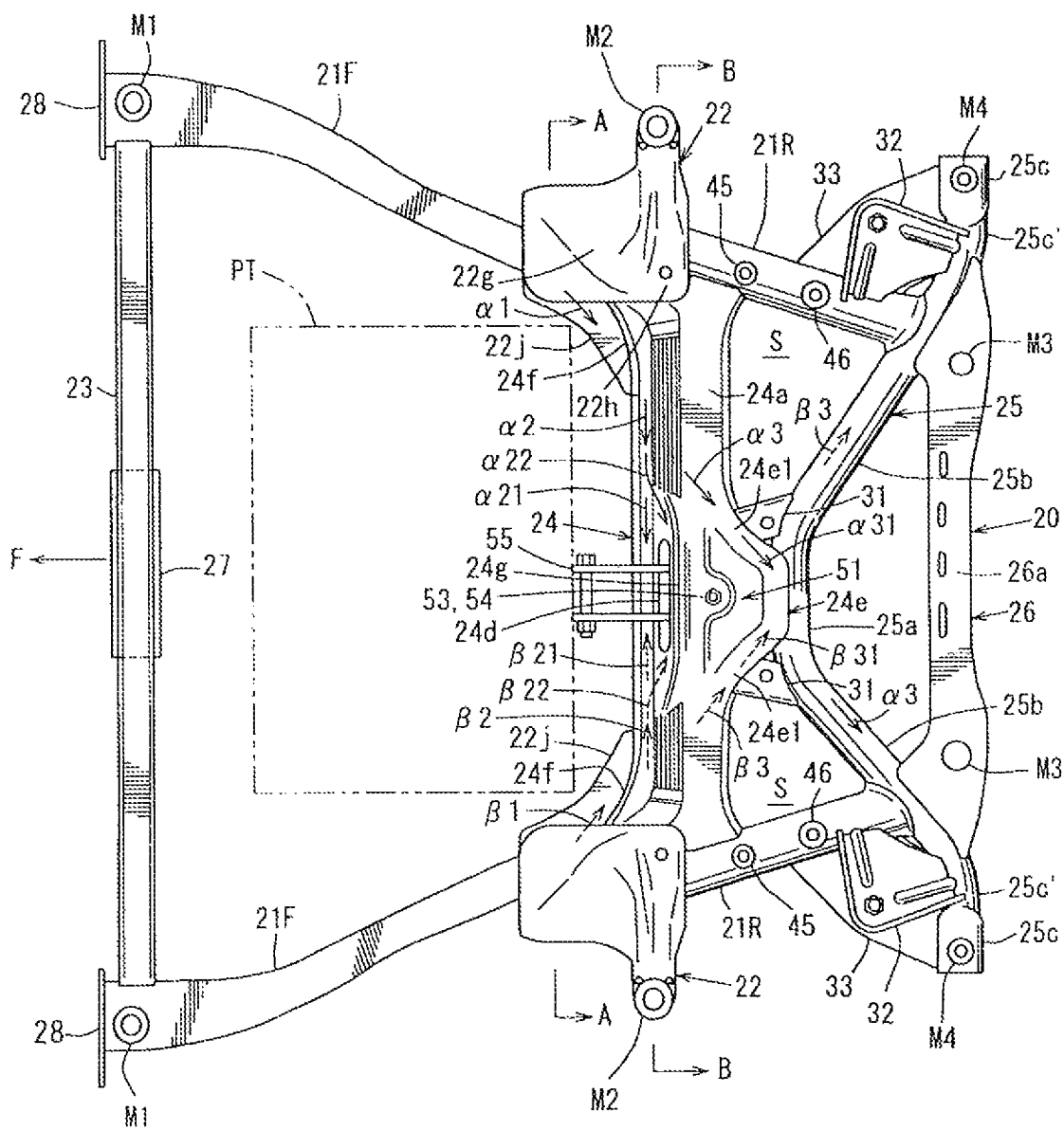
FIG. 3 is a plan view illustrating the front subframe structure.
Figure 4:
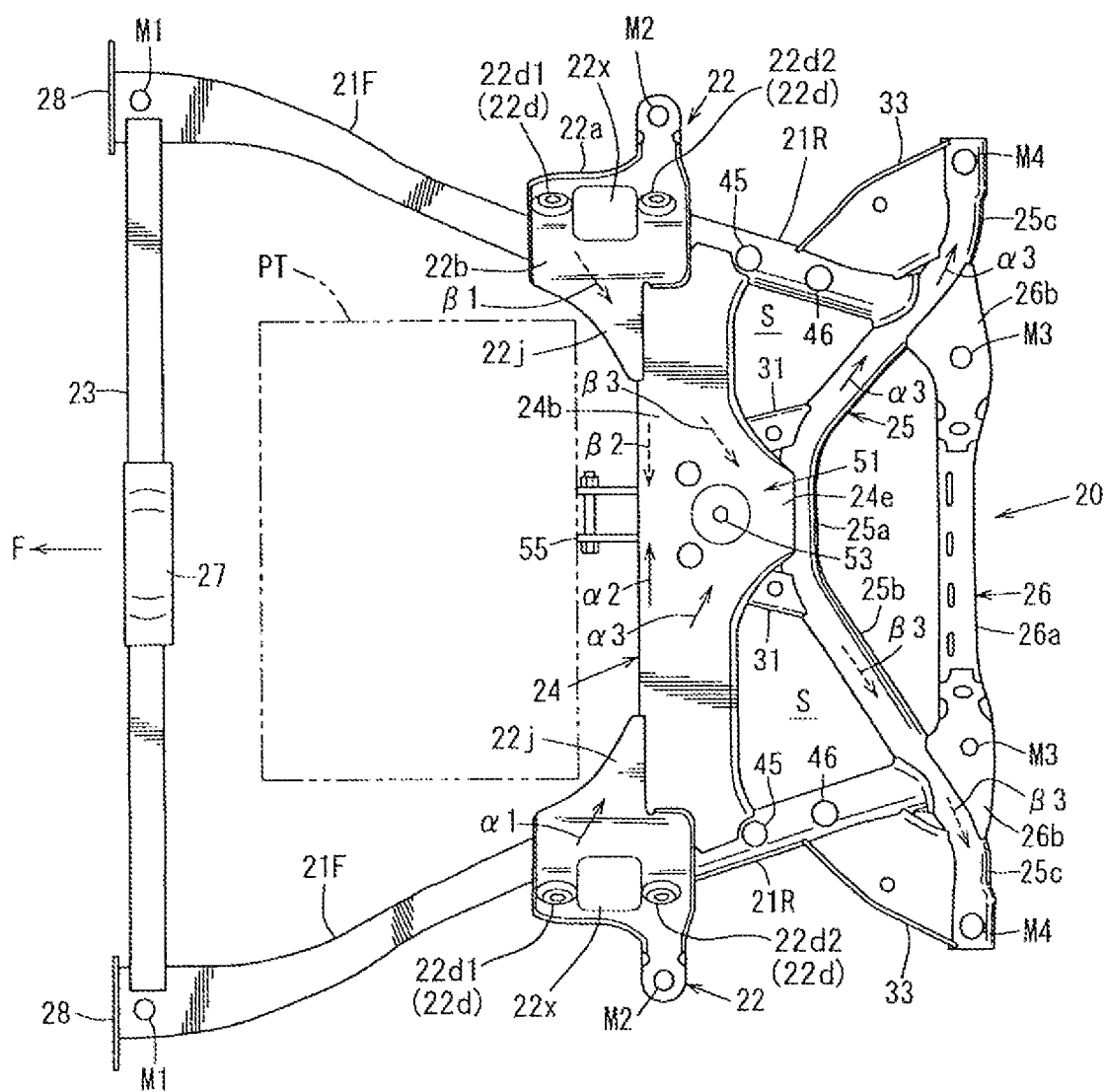
FIG. 4 is a bottom view of FIG. 3.
Figure 5:
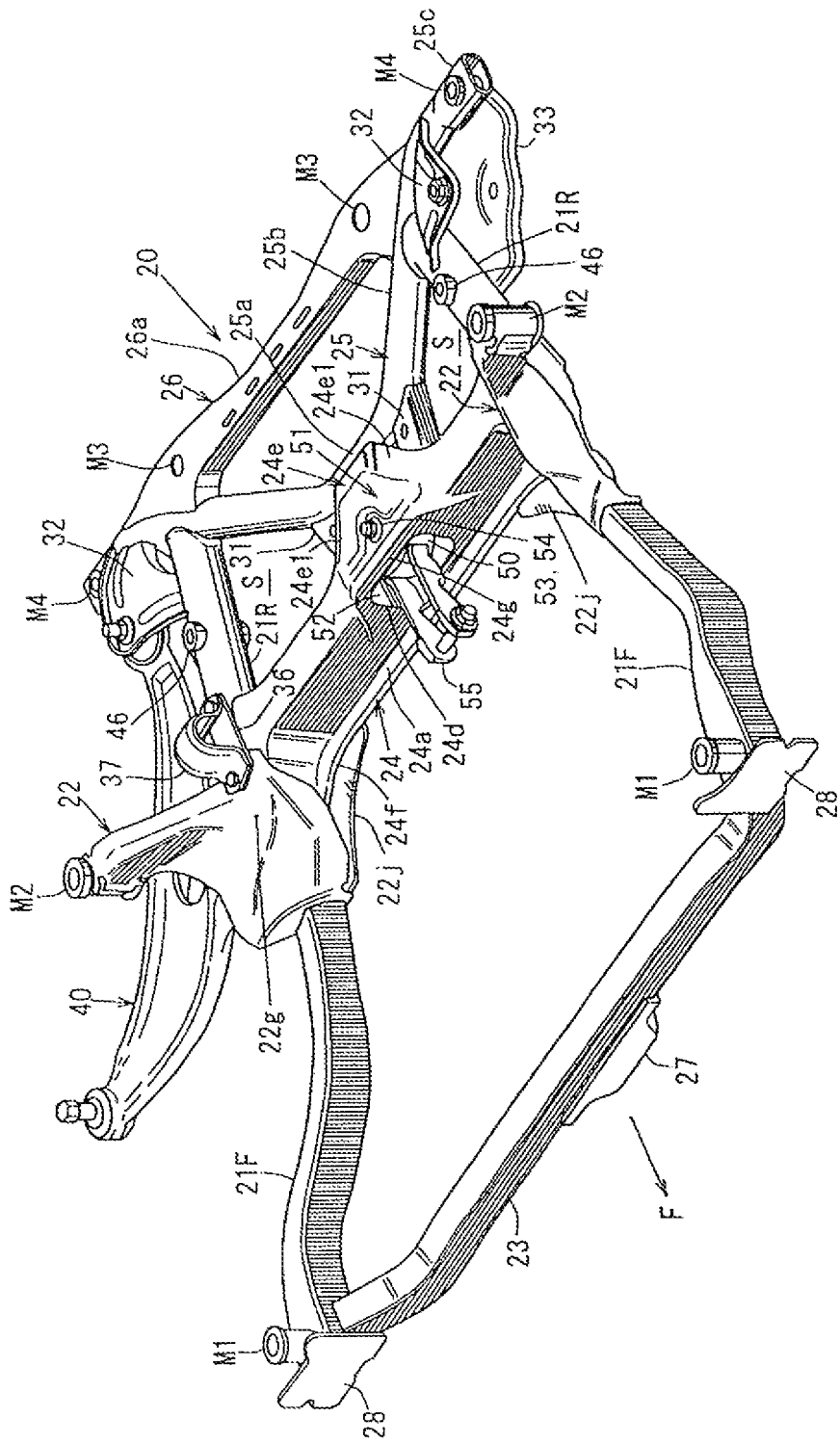
FIG. 5 is a perspective view illustrating the front subframe structure.
Figure 6:
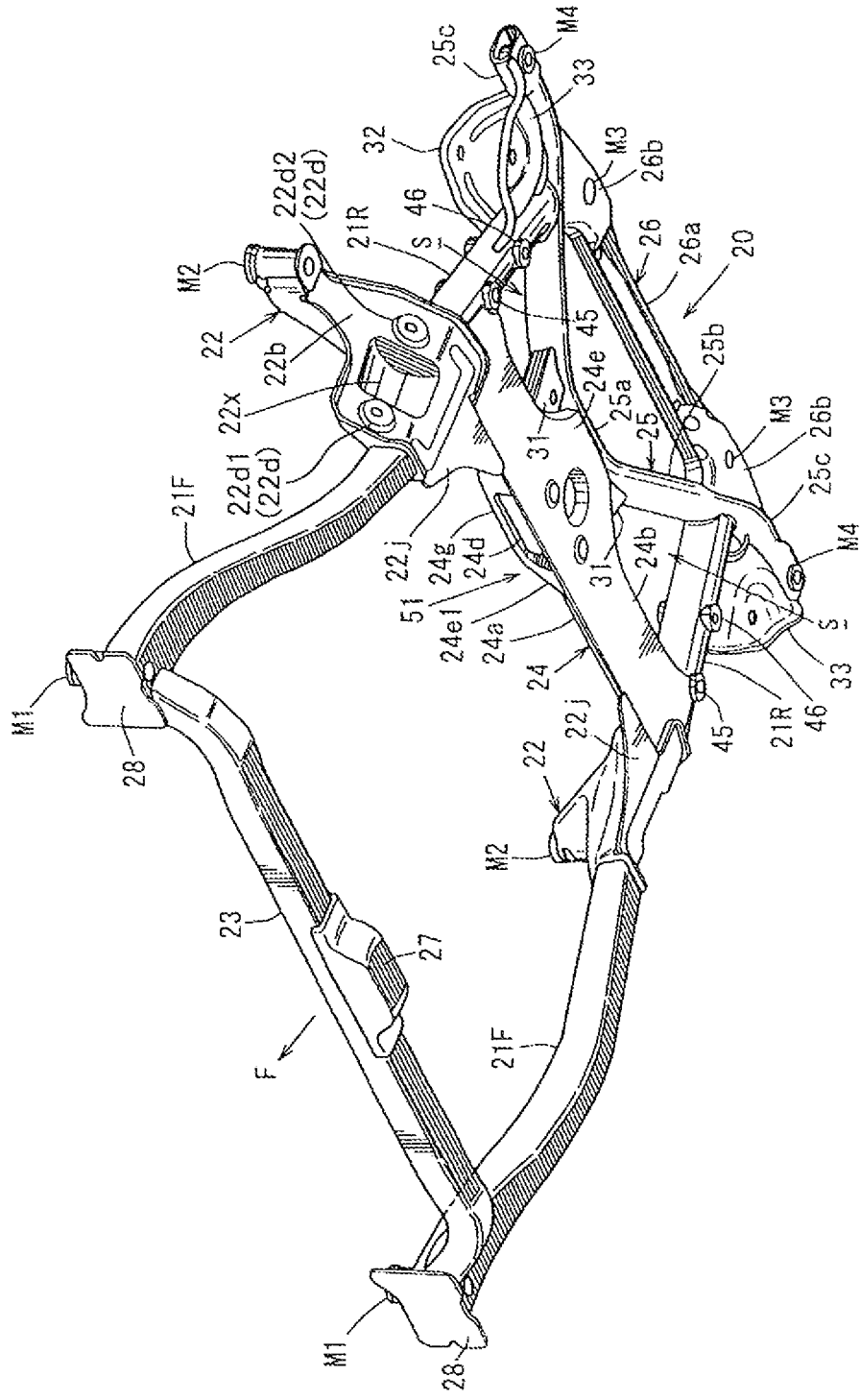
FIG. 6 is a perspective view of the front subframe structure viewed obliquely upward.

FIG. 3 is a plan of the subframe, FIG. 4 is a bottom view of the subframe, FIG. 5 is a perspective view of the subframe, and FIG. 6 is a perspective view of the subframe viewed obliquely upward.

As illustrated in FIGS. 1 and 2, a subframe 20 illustrated in FIGS. 3 to 6 is arranged under the pair of left and right front side frames 7 arranged in the front portion of the vehicle body.

As illustrated in FIGS. 3 to 6, the subframe 20 includes front and rear pairs of left and right side members 21F and 21R each having a tubular form, i.e., formed of a pipe extending in the vehicle front-rear direction, left and right vehicle body attaching portions 22 (which is so-called "horn-like members", and will be simply referred to as "towers" hereinafter) extending upwardly from positions between the front and rear side members 21F and 21R (intermediate portion of the side members), and coupled to the left and right front side frames 7 illustrated in FIGS. 1 and 2, respectively, a front cross member 23 (so-called "No. 0 cross member") extending in the vehicle-width direction between the front side members 21F, a center cross member 24 extending in the vehicle-width direction between the front portions of the rear side members 21R, an inclined member 25 (so-called V-shaped brace) having a V-shaped form in a plan view and extending between the vehicle-widthwise middle portion of the rear portion of the center cross member 24 and rear ends of the side members 21R on the rear side, and a rear cross member 26 extending in the vehicle-width direction between the left and right rear portions of the inclined member 25 that correspond to the rear ends of the rear side members 21R, respectively.

As illustrated in FIGS. 5 and 6, a front mount pipe M1 (representing the same meaning as a "mount bushing") that serves as a No. 1 mount pipe is coupled to the front portion of the front side member 21F, a center mount pipe M2 serving as a No. 2 mount pipe is coupled to a vehicle-outer side of the upper portion of the tower 22, a rear mount pipe M4 serving as a No. 4 mount pipe is coupled to each rear end of the inclined member 25, and a mount point M3 is set in each of the left and right side portions of the rear cross member 26.

As illustrated in FIGS. 1 and 2, the pair of left and right front mount pipes M1 are coupled to the lower surface of the front portion of the front side frames 7, respectively, the pair of left and right center mount pipes M2 are coupled to the lower surfaces of the vehicle-longitudinally middle portions of the front side frames 7, respectively, the pair of left and right rear mount pipes M4 are coupled to the lower surfaces of the rear portions of the front side frames 7, respectively, and the pair of left and right mount points M3 are coupled to the front portion lower surfaces of the tunnel members 4 through No. 3 mount pipes (not illustrated), respectively.

Thus, the subframe 20 is mounted on the vehicle body at totally eight points on the left and right sides (4 points on each side).

As illustrated in FIGS. 5 and 6, the front side member 21F is produced by hydro-forming a metal square pipe to have a frame- or box-like square section, and has a closed cross-section space extending in the vehicle front-rear direction.

The rear side member 21R is formed of a metal circular pipe, and has a closed cross-section space extending in the vehicle front-rear direction.

The front cross member 23 is formed by processing the metal square pipe, and has a closed cross-section space extending in the vehicle-width direction.

A jack retainer 27 made of resin is attached to a widthwise-central and lower portion of the front cross member 23, and is configured to allow use of the jack retainer 27 as a jack-up point when the vehicle is to be jacked up.

As illustrated in FIGS. 1 and 2, a sub-crash can 30 is attached to the front end of the front side member 21F through flanges 29 and 30. Both of the sub-crash can 30 on the front end of the side member 21F and the crash can 10 on the front end of the front side frame 7 are shock-absorbing members.

The center cross member 24 couples the left and right side members 21R, and has a center cross member upper 24a having a substantially hat-shaped cross section and a center cross member lower 24b located in a lower position of the center cross member upper 24a. The center cross member upper 24a and the center cross member lower 24b are fixedly joined with each other to form a closed cross-section space 24c (see FIG. 8) extending in the vehicle-width direction. An opening 24d for a powertrain mount 50 to be described later is formed at a front surface in a vehicle-widthwise middle portion of the center cross member 24. Corresponding to the opening 24d, each of the center cross member upper 24a and the center cross member lower 24b is integrally provided with an expanded portion 24e expanding to the rear side of the vehicle beyond the rear edges of the left and right sides of the center cross member 24 in the middle portion of the vehicle-widthwise direction. The front center of the inclined member 25 is coupled to a position between the upper and lower expanded portions 24e (see FIG. 1).

A pair of left and right openings S is surrounded by the center cross member 24, the inclined member 25 and the side members 21R.

As illustrated in FIGS. 3 and 4, the expanded portion 24e has a trapezoidal form protruding toward the rear of the vehicle, and is provided at its left and right outer shells with a pair of left and right longitudinal walls 24e1 which are inclined and extend in the front-rear direction, respectively. The longitudinal walls 24e1 of the expanded portion 24e are coupled in the front-rear direction to the inclined member 25 by a pair of left and right braces 31 made of metal square pipes and having closed cross-section structures, respectively.

In this embodiment, a mount attaching portion 51 for the powertrain mount 50 is arranged behind the front edge of the center cross member 24 and in front of the inclined member 25. The mount attaching portion 51 is formed of the expanded portions 24e.

The inclined member 25 extends in the vehicle-width direction at the rear (vehicle cabin side) of the center cross member 24, forms the cabin-side cross member, and is carried by the vehicle body through the rear mount pipes M4.

The inclined member 25 has a closed cross-section structure prepared by processing a metal square pipe. The inclined member 25 integrally has, as illustrated in FIGS. 3 to 6, a central portion 25a located on the front side and extending in the vehicle-width direction, inclined portions 25b extending vehicle-widthwise inward and forward (outer side in the front-rear direction opposite to the vehicle cabin) toward the central portion 25a, and rear portions 25c extending vehicle-widthwise outward from the rear ends of the inclined portions 25b.

As illustrated in FIGS. 3 and 4, the rear side member 21R extends forward from the inclined member 25, and has a rear end butted and coupled to the front surface of the rear portion (surface on the front-rear direction outer side) of the inclined portion 25b of the inclined member 25.

The rear mount pipe M4 already described is arranged in the position spaced in the vehicle-widthwise outward direction from the connection point where the inclined member 25 is coupled to the side member 21R, and the foregoing mount point M3 is set in the position opposite to the connection point described above.

Between the side member 21R and the rear portion 25c of the inclined member 25, there are attached lower arm brackets 32 and 33 on the upper and lower sides, each of which supports a rear side of a lower arm 40 (see FIG. 5) from the upper or lower side and is arranged in a position spaced forward from the rear mount pipe M4. These lower arm brackets 32 and 33 in the upper and lower positions are integrally provided with concave and convex portions such as beads to increase rigidity of the lower arm brackets 32 and 33 themselves.

The lower arm bracket 32 on the upper side has one end coupled to the side member 21R, has the other end which is spaced in the vehicle-width direction from the rear mount pipe M4 on the vehicle-widthwise outer side, and is coupled at a position between the mount point M3 and the rear mount pipe M4 to a bent portion 25c' (see FIGS. 3 and 11) of the rear portion 25c of the inclined member 25. The lower arm bracket 33 on the lower side has one end coupled to the side member 21R, and has the other end coupled to a lower portion of the rear portion 25c (rear mount pipe M4) of the inclined member 25.

As illustrated in FIGS. 3 and 4, the rear cross member 26 is made of sheet metal, and includes a rear cross member upper 26a having a gate-shaped cross section, and rear cross member lowers 26b located under the rear cross member upper 26a and fixedly joined to the left and right vehicle-widthwise outer sides thereof. The rear cross member upper 26a located on the upper side passes between the left and right rear portions 25c of the inclined member 25, and extends in the vehicle-width direction collinearly with the rear portion 25c in a plan view.

The mount points M3 already described are set at vehicle-widthwise opposite ends of the rear cross member 26.

Figure 7:
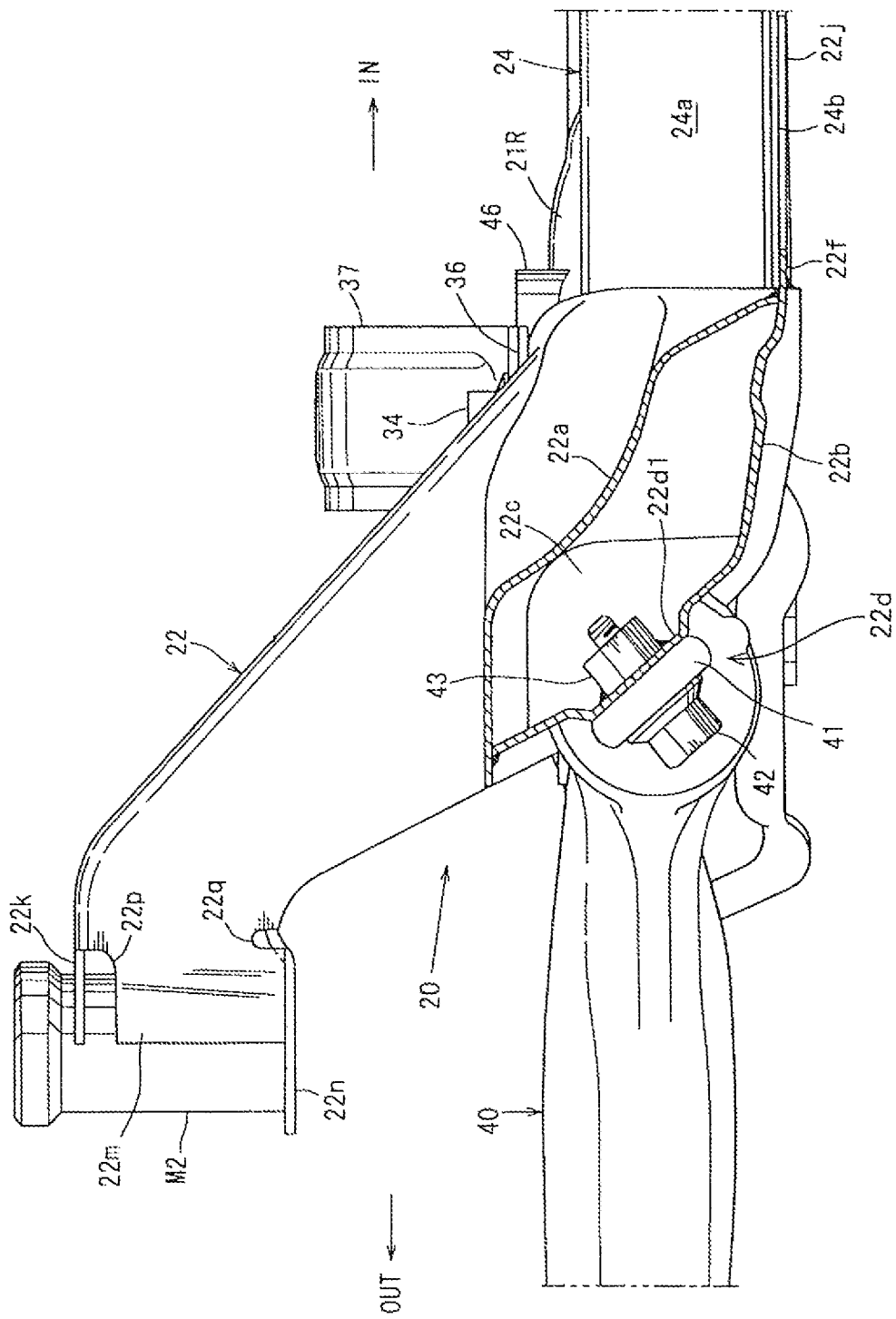
FIG. 7 is a cross-section view taken along line A-A in FIG. 3.
Figure 8:
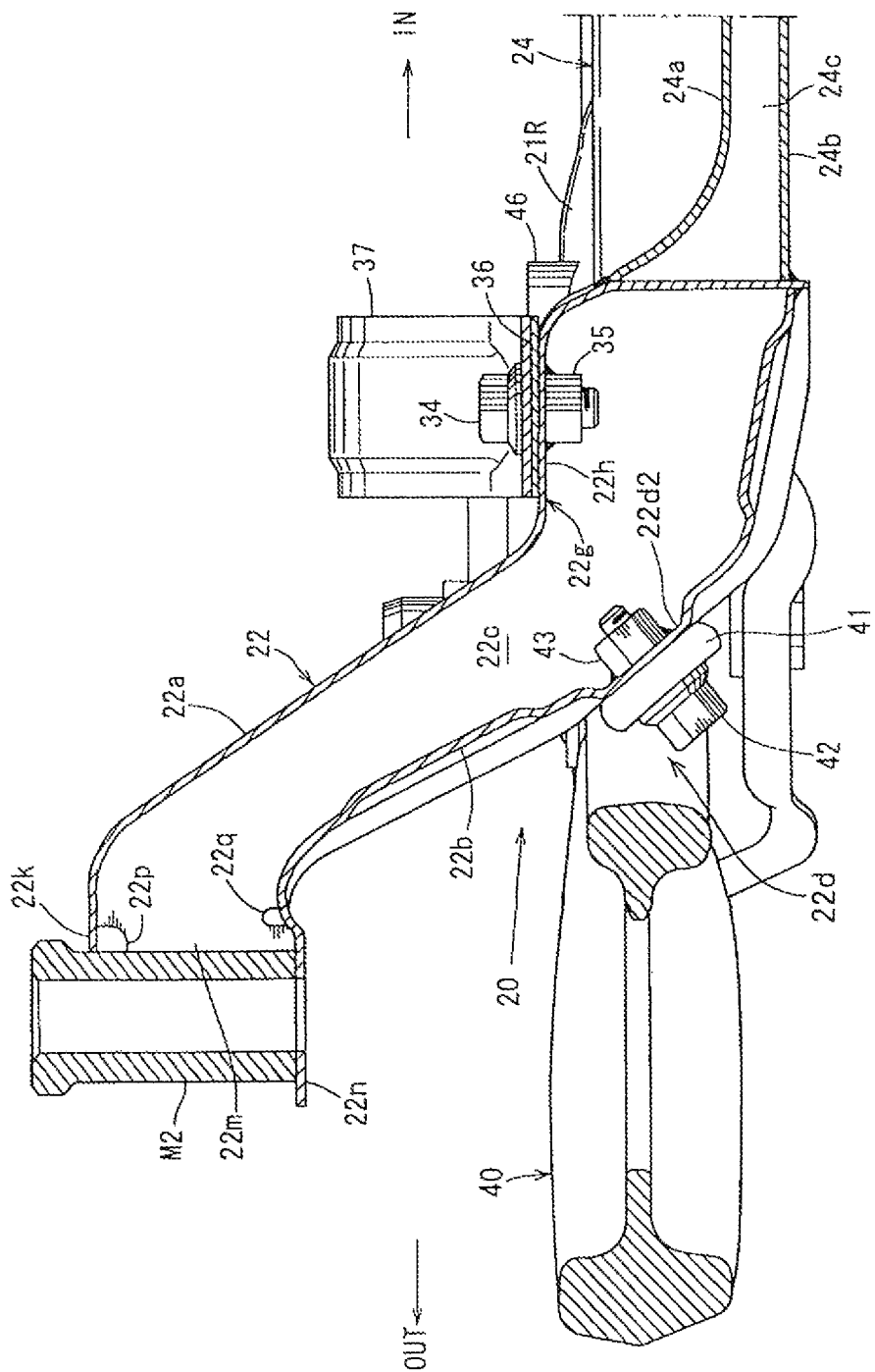
FIG. 8 is a cross-section view taken along line B-B in FIG. 3.

FIG. 7 is a cross-section view taken along line A-A in FIG. 3 and illustrating a vehicle-right side. FIG. 8 is a cross-section view taken along line B-B in FIG. 3 and illustrating a vehicle-right side. The tower 22 serving as the vehicle body attaching portion includes, as illustrated in FIGS. 7 and 8, a mount bracket upper 22a having a substantially C-shaped section and a mount bracket lower 22b joined and fixed to the mount bracket upper 22a, and is arranged in a position spaced forward from the central portion of the rear mount pipe M4 and the center cross member 24.

As illustrated in FIG. 8, the tower 22 has a closed cross-section space 22c containing at least the lower portion of the side member 21F or 21R and extending upward and vehicle-widthwise outward from the lower surface thereof.

In this embodiment, the closed cross-section space 22c extends obliquely upward toward the outer side of the vehicle. Front and rear lower arm supports 22d1 and 22d2 (see FIG. 4) carrying the front side of the lower arm 40 (see FIG. 5) are arranged in the lower portion of the closed cross-section space 22c extending obliquely upward toward the outer side of the vehicle. (The reference numbers "22d1" and "22d2" are assigned to the low arm supports on the front and rear sides, respectively. The reference number "22d" is assigned to the whole lower arm supports.) A lower surface portion 22f at its lower end is coupled to the center cross member lower 24b of the center cross member 24 as illustrated in FIG. 7. This structure disperses a load (particularly, a lateral load during turning of the vehicle) applied from the lower arm 40 to the front side frames 7, and smoothly transmits it to the center cross member 24 to disperse the load. In this structure, each of the front and rear lower arm supports 22d1 and 22d2 is raised and projected downward with respect to the mount bracket lower 22b, and this raised structure increases the strength of the lower arm support 22d itself.

As illustrated in FIG. 5, the tower 22 has a box-shaped lower portion, from which a portion having a horn-like form extends upward. The side member is formed of the divided two portions, i.e., the front side member 21F and the rear side member 21R. As illustrated in FIGS. 3 and 4, the rear end of the front side member 21F is coupled to the front surface of the box-shaped portion of the tower 22, and the front end of the rear side member 21R is coupled to the rear surface of the box-shaped portion of the tower 22. When the load is applied, the load is transmitted to the center cross member 24 without collapsing the closed cross-section spaces of the side members 21F and 21R, and can be dispersed.

In other words, each of the front and rear side members 21F and 21R is configured to continue in the vehicle front-rear direction through the box-shaped portion of the closed cross-section structure of the tower 22.

As illustrated in FIGS. 7 and 8, the lower arm support 22d of the tower 22 is formed at the surface portion on the vehicle-widthwise outward side, and ensures the assembling property by allowing the lower arm support 22d to support a support bracket 41 of the lower arm 40 with fasteners such as a bolt 42 and a nut 43. Also, the lower arm support 22d is configured to form the smooth closed cross-section space 22c of the tower 22 between the front side frame 7 and the side members 21F and 21R.

As illustrated in FIG. 8, the vehicle-widthwise outer side surface portion of the tower 22, i.e., one of the mount bracket upper 22a and mount bracket lower 22b and particularly the mount bracket lower 22b located at the vehicle-widthwise outer side surface is configured such that it is linearly inclined between the side member 21F or 21R and the front side frame 7 to improve the lateral load dispersing performance.

Further, as illustrated in FIGS. 6, 7 and 8, the lower arm supports 22d1 and 22d2 of the tower 22 are configured by dividing the closed cross-section space 22c into front and rear portions to form the front and rear support portions 22d1 and 22d2, and these are configured such that the closed cross-section space 22c increases the rigidity of the lower arm support 22d by itself, and in that connection, the support rigidity of the lower arm 40 is improved.

As illustrated in FIGS. 3 and 8, at the position where the center cross member 24 overlaps, in the vehicle front-rear direction, the tower 22, an upper surface portion 22g at a lower portion of the tower 22 is partially provided with a horizontal portion 22h. Using fasteners such as bolts 34 and nuts 35, front portions of stabilizer support brackets 36 and 37 serving as accessory attaching brackets are attached to the horizontal portion 22h.

As illustrated in a perspective view of FIG. 5, the lower stabilizer support bracket 36 has a flat form, and the upper stabilizer support bracket 37 has an Ω-form. These upper and lower stabilizer support brackets 36 and 37 support a stabilizer (not illustrated) serving as the accessory.

The stabilizer provides a torsional rigidity resistance to suppress a roll angle at the time of bumping or rebounding with a wheel on only one side, as is well known.

As illustrated in FIGS. 3 and 4, the side member 21R is provided at vehicle-longitudinally spaced positions with a bushing 45 for attaching the stabilizer and a bushing 46 for attaching a steering rack, respectively. Each bushing 45 or 46 is formed of a rigid pipe coupling by welding the upper and lower surfaces of the side member 21R together.

To the bushing 45 for attaching the stabilizer, rear portions of the stabilizer support brackets 36 and 37 are attached with fasteners such as bolts and nuts, similarly to FIG. 8 (see FIG. 5).

As illustrated in FIG. 8, the upper surface portion 22g of the lower portion of the tower 22 including the foregoing horizontal portion 22h is coupled to the center cross member 24. This prevents the collapse of the closed cross-section spaces of the side members 21F and 21R to a further extent, and improves the coupling strength of the tower 22 to the center cross member 24.

As illustrated in FIG. 4, the center cross member 24 is shifted rearward, through its vehicle-widthwise entire length, from the tower 22 such that the vehicle front-rear position thereof may overlap at least one of the front and rear supports 22d1 and 22d2 of the tower 22, and in this embodiment, may overlap the rear support 22d2. Because of that, it is configured to ensure both the vehicle-widthwise load transmission path and the layout property of the powertrain PT (see FIGS. 3 and 4) of a front-engine type formed of an automobile engine or drive motor.

As illustrated in FIGS. 3 and 5, the center cross member 24 has its widthwise opposite ends which obliquely extend in the vehicle front-rear direction toward the mounts of the towers 22, and particularly toward the front lower arm supports 22d1, and thereby has extensions 24f extended obliquely toward the outer front sides, respectively. Also, as illustrated in FIG. 4, the mount bracket lower 22b of the tower 22 is integrally provided at its vehicle-widthwise inner side with an extended portion 22j extending obliquely to the front side, in the vehicle front-rear direction, of each side portion of the center cross member 24. This extended portion 22j is coupled to the center cross member 24. The foregoing inclined member 25 is coupled to the vehicle-widthwise middle portion of the rear side of the center cross member 24, i.e., on the side opposite to the portion coupled to the extended portion 22j in the vehicle front-rear direction.

In the inclined member 25, the inclined portion 25b extends, in a plan view, from the rear mount pipe M4 on the rear side toward the lower arm support 22d on the vehicle-widthwise opposite side.

This structure ensures the load transmission paths in the vehicle-width direction and the inclined direction.

More specifically, as indicated by arrows α1 in FIGS. 3 and 4, when the right lower arm support 22d receives a load, it transmits the load from the extended portion 22j to the center cross member 24, and then the load is partially transmitted in the vehicle-width direction along the front edge of the center cross member 24 as indicated by solid arrows α2 in FIGS. 3 and 4. At the same time, it can be divided and transmitted from the center cross member 24 to the left inclined portion 25b of the inclined member 25 as indicated by a solid arrow α3.

Conversely, when a load is applied from the left lower arm support 22d, the load is transmitted from the extended portion 22j to the center cross member 24 as indicated by dotted arrows β1 in FIGS. 3 and 4, and then can be partially transmitted in the vehicle-width direction along the front edge of the center cross member 24, as indicated by dotted arrows β2 in FIGS. 3 and 4. At the same time, it can be divided and transmitted from the center cross member 24 to the right inclined portion 25b of the inclined member 25, as indicated by dotted arrows β3.

Therefore, the load transmission path from the left and right lower arm supports 22d can ensure load transmission through the vehicle-width direction load transmission path (arrows α2 and β2) that transmits the load along the center cross member 24 as well as the inclined-direction load transmission path (arrows α3 and β3) that transmits the load along the center cross member 24 and the inclined member 25 in a X-shaped fashion in a plan view.

Particularly, in this embodiment, the center mount pipe M2 (i.e., so-called No. 2 mount pipe) of the tower 22, the rear lower arm support 22d2 and the front edge of the center cross member 24 are aligned linearly in the vehicle-width direction to form the load transmission path in the vehicle-width direction. In that connection, the installation space for the mount attaching portion 51 is ensured behind the front edge of the center cross member 24, the layout property of the powertrain PT is ensured, and the load transmission in the vehicle-width direction can be smoothly performed when the load is applied from the lower arm supports 22d.

Specifically, at the time of load input, the vehicle-width direction load transmission path and the inclined-direction load transmission path described above are formed so that, in the vehicle-widthwise middle portion behind the front edge of the center cross member 24, a low stress portion in which the load transmission path is not formed is formed.

In this embodiment, the mount attaching portion 51 avoiding the load transmission paths described above is arranged in the low stress portion. In that connection, the influence of the load is prevented from being applied to the powertrain mount 50 arranged in the central portion of the rear surface of the powertrain PT, and it can be arranged in a compact fashion in the center cross member 24 to ensure the layout property of the powertrain PT.

Figure 9:
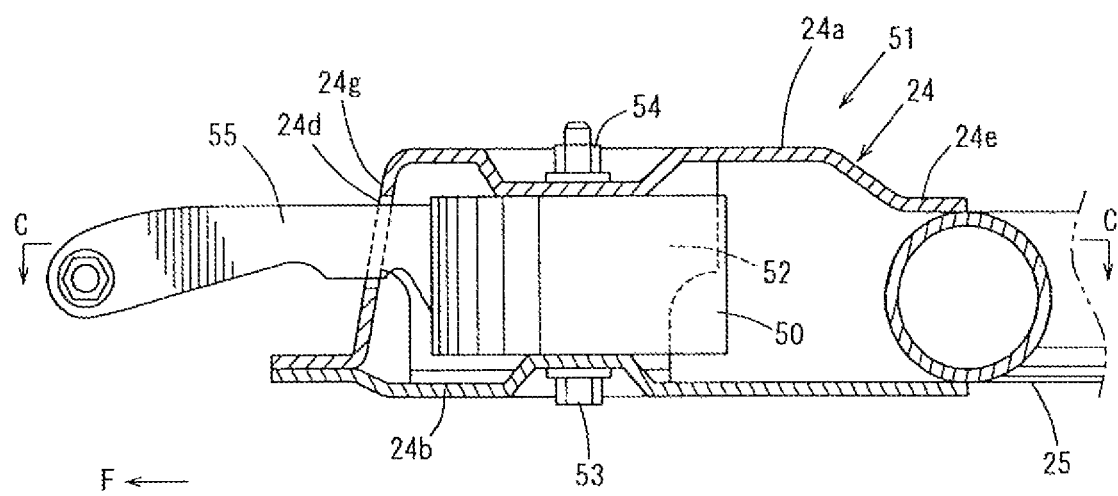
FIG. 9 is an enlarged cross-section view illustrating a major portion of a mount attaching portion.
Figure 10:
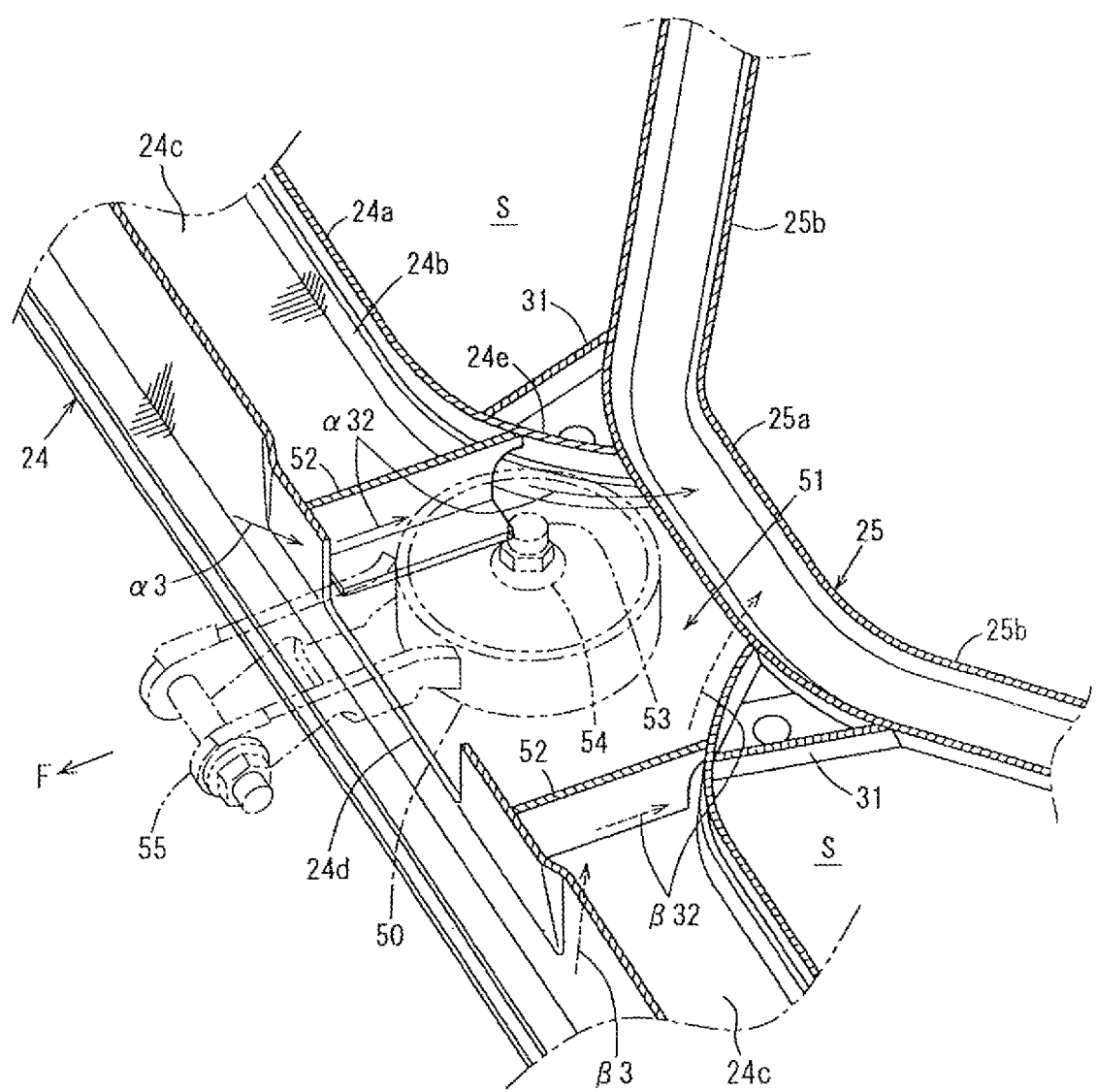
FIG. 10 is a cross-section view taken along line C-C in FIG. 9.

FIG. 9 is an enlarged cross-section view illustrating a major portion of the mount attaching portion, and FIG. 10 is a cross-section view taken along line C-C in FIG. 9. In the expanded portion 24e of the center cross member 24, as illustrated in FIGS. 5, 9 and 10, internal partitions 52 formed of longitudinal walls extending in the front-rear direction are arranged at the left and right of the mount attaching portion 51, respectively, and the front and rear ends of the internal partition 52 are connected to the front and rear surfaces of the center cross member 24, respectively. At the rear positions corresponding to the left and right internal partitions 52, the braces 31 are arranged to reinforce the rear portion of the expanded portion 24e (mount attaching portion 51), respectively.

At the mount attaching portion 51, the opening 24d is arranged in a position where it does not intersect imaginary lines L (see alternate long and short dash line in FIG. 2) connecting the left and right side ends of the front edge of the center cross member 24 to the coupling portion to the inclined member 25, and the opening 24d is spaced rearward and downward from the foregoing front edge.

Further, the center cross member 24 is provided at its front surface with a bypass passage 24g that extends in the vehicle-width direction, bypasses the front edge described above and is located on the side opposite to the front edge described above with the opening 24d interposed therebetween.

According to this structure, when the vehicle-width direction load is transmitted in the vehicle-width direction along the front edge at the front of the opening 24d as indicated by solid and dotted arrows α21 and α21 in FIG. 3. At the same time, it is partially diverged from the front edge and is transmitted to the bypass passage 24g, as indicated by solid and dotted arrows α22 and β22 in FIG. 3.

As indicated by solid and dotted arrows α31 and β31 in FIG. 3, the inclined-direction load is transmitted through the longitudinal walls 24e1 of the expanded portion 24e to the inclined member 25 and, at the same time, is partially transmitted to the inclined member 25 through the internal partitions 52, as indicated by solid and dotted arrows α32 and β32 in FIG. 10.

The powertrain mount 50 has a cylindrical form as illustrated in FIGS. 1, 5, 9 and 10, and an inner cylinder at its center is coupled and fixed to the upper and lower expanded portions 24e by fasteners such as bolts 53 and nuts 54 so that it is fixed inside a space of the mount attaching portion 51 (a space between the upper and lower expanded portions 24e in this embodiment). Thus, the powertrain mount 50 is accommodated in the center cross member 24. In the center cross member 24, the bolts 53 and the nuts 54 attaching the powertrain mount 50 couple the upper and lower expanded portions 24e so that the whole center cross member 24 including the expanded portions 24e are reinforced.

A link 55 is attached to the rear portion of the powertrain PT. The link 55 is inserted through the opening 24d, and is coupled to the powertrain mount 50 in the mount attaching portion 51 so that the subframe 20 carries the rear portion of the powertrain PT.

As illustrated in FIGS. 3 and 4, the rear end portion of each of the vehicle-widthwise opposite ends of the center cross member 24 overlaps, in the front-rear direction, the stabilizer attaching bushing 45 so that it is configured to prevent the collapse of the closed cross-section space of the side member 21R while extending the stabilizer in the vehicle-width direction.

As illustrated in FIGS. 7 and 8, a structure connecting the center mount pipe M2 and the tower 22 is configured as follows.

The tower 22 includes an upper wall 22k and front and rear longitudinal walls 22m which are formed integrally with the mount bracket upper 22a, and also includes, independently, a lower wall 22n formed integrally with the mount bracket lower 22b. For example, similar to Japanese Patent Application Publication No. 2011-162159, the upper wall 22k and the longitudinal walls 22m are welded to the center mount pipe M2, but the lower wall 22n is not welded to the center mount pipe M2. Further, recesses 22p and 22q are formed at upper and lower portions of the base portion of each of the front and rear longitudinal walls 22m to provide such a configuration that, at the time of forward collision of the vehicle, the vehicle body attaching portion (tower 22) of the subframe 20 can be released while leaving the center mount pipe M2 in the vehicle body so that backward movement of the powertrain PT can be allowed.

Figure 11:
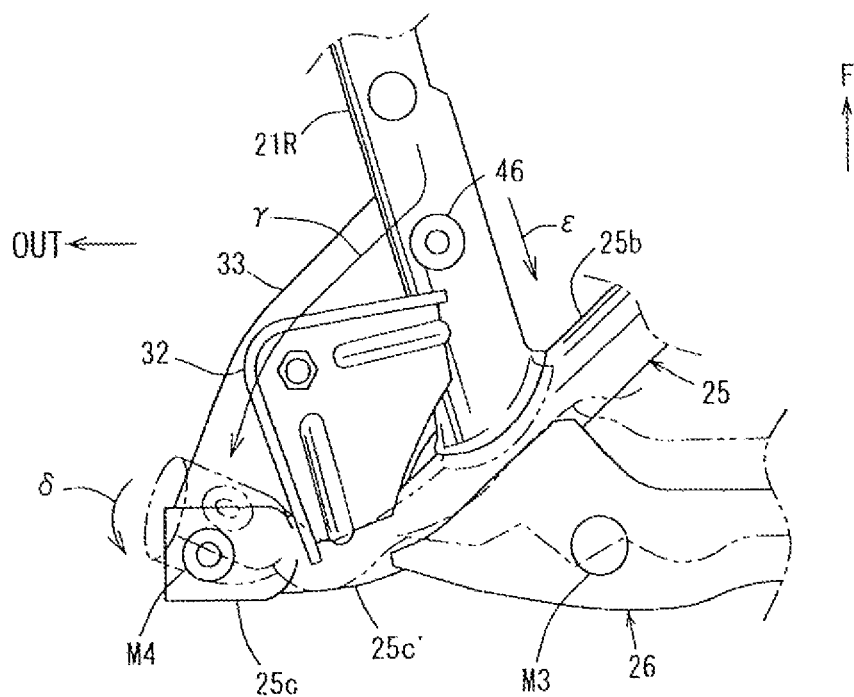
FIG. 11 illustrates application of a collision (forward collision) load.
Figure 12:
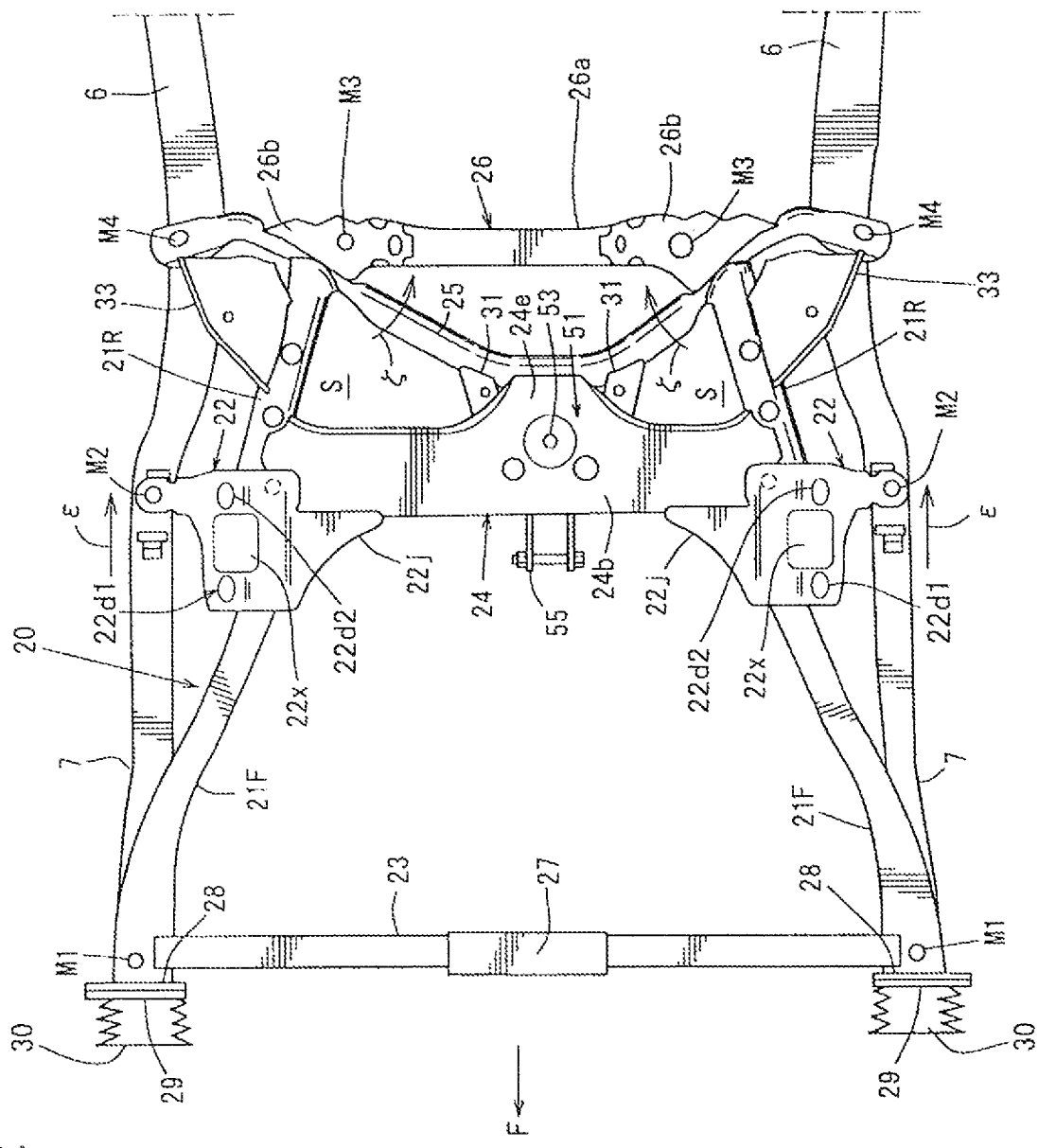
FIG. 12 illustrates application of a collision (forward collision) load.

FIGS. 11 and 12 illustrate application of a collision (forward collision) load. When the collision load is applied from the forward side of the vehicle at the time of vehicle collision (forward collision), the front side frames 7 start displacement and, at the same time, the sub-crash can 30 serving as the impact absorbing member collapses in the front-rear direction to absorb the impact (impact load) as illustrated in FIG. 12.

In the subframe 20, the collision load enters the lower portion of the rear portion 25c (rear mount pipe M4) through the front side frame 7, the side members 21F and 21R, and the lower arm bracket 33 as illustrated by solid arrow γ in FIG. 11, because the other end of the lower arm bracket 33 on the lower side is coupled to the lower portion of the rear portion 25c (rear mount pipe M4) of the inclined member 25.

At this time, the collision load applied to the other end (bent portion 25c') of the lower arm bracket 32 on the upper side is smaller than that at the lower portion of the rear mount pipe M4 because the other end (bent portion 25c') is spaced from the rear mount pipe M4.

In this embodiment, since the collision load is applied disproportionately to the lower portion of the rear mount pipe M4, the stress concentrates in the lower portion of the rear mount pipe M4 to generate a torsion moment rearwardly displacing the lower portion of the rear mount pipe M4, as illustrated in solid arrow δ in FIG. 11. As illustrated by alternate long and two short dashes line in FIG. 11, this torsion moment acts to twist the rear portion 25c. Owing to the twisting of the rear portion 25c, the rear mount pipe M4 can be displaced from the front side frame 7.

Further, since the rear end of the side member 21R is connected to the front surface on the rear side of the inclined member 25 by contact, the front surface on the rear side of the inclined member 25 is collapsed in the front-rear direction by the side member 21R, as indicated by alternate long and two short dashes line in FIG. 11, and the side members 21R and 21F are displaced relatively rearward with respect to the front side frame 7 according to this collapse of the inclined member 25, as indicated by solid arrow ε in FIGS. 11 and 12.

When the collision load is further applied, the inclined portion 25b of the inclined member 25 entirely deforms to rotate rearward and inward in the vehicle-width direction around the rear mount pipe M4, as indicated by solid arrow ζ in FIG. 11. At this time, the connection portion of the side member 21R is displaced rearward so that the relative displacement of the side members 21R and 21F is further promoted.

As described above, when the side member 21R moves relatively, three-dimensional torsion occurs in the center mount pipe M2 similar to Japanese Patent Application Publication No. 2011-162159, because the tower 22 has the recesses 22p and 22q.

Since the lower wall 22n is not welded to the center mount pipe M2, the lower portion of the center mount pipe M2 has a lower rigidity than the side, front and rear portions. Therefore, a stress concentrates on a part of the tower 22 to disengage the center mount pipe M2 from the tower 22.

In the tower 22, as described above, the lower wall 22n is not welded to the center mount pipe M2, and each longitudinal wall 22m is provided at the upper and lower portions of its base with the recesses 22p and 22q, respectively. Therefore, when the side members 21F and 21R are displaced relatively to the front side frame 7, the center mount pipe M2 can be disengaged from the tower 22 to isolate the vehicle body attaching portion (tower 22) from the front side frame 7. In other words, owing to the relative displacement of the side members 21F and 21R with respect to the front side frame 7, the lower wall 22n and the recesses 22p and 22q of the tower 22 function as releasing means which allows releasing of the vehicle body attaching portion (tower 22) from the front side frame 7.

The structure of releasing the vehicle body attaching portion (tower 22) by the relative displacement of the side members 21F and 21R is not necessarily restricted to the above. For example, the tower 22 may be made of a casting which is partially recessed. In this case, the recessed portions function as the releasing means, and the deformation of the tower 22 starting from the recessed portions allows releasing from the front side frame 7.

Weak portions (recesses, thin portions or the like) may be partially formed in the center mount pipe M2 and the fastener member fastening the center mount pipe M2 to the tower 22 so that deformation or breakage starting from these weak portions may release the tower 22. In this case, the weak portions formed in the center mount pipe M2 and the fastener member function as the releasing means.

The portion for releasing the vehicle body attaching portion (tower 22) by the operation of the releasing means is not necessarily restricted to the middle portion (tower 22) corresponding to the center mount pipe M2, and may be a front portion corresponding to the front mount pipe M1.

In FIGS. 2, 4 and 6, 22x indicates a concavity formed in the mount bracket lower 22b to avoid interference with the lower arm 40. In the figures, an arrow F indicates a vehicle forward direction, an arrow IN indicates an inward direction in the vehicle-width direction, and an arrow OUT indicates an outward direction in the vehicle-width direction.

As described above, the front subframe structure of the automobile illustrated in FIGS. 1 to 12 includes pairs of the left and right side members 21F and 21R, the center cross member 24 having the closed cross-section structure, extending in the vehicle-width direction and coupling the a pair of left and right side members 21F and 21R together, and the inclined member 25 having a V-shaped form in a plan view and coupled to the rear surface of the central portion of the center cross member 24 as well as the mount attaching portion 51 for the powertrain mount 50 arranged behind the front edge of the center cross member 24 and in front of the inclined member 25 (see FIGS. 1 to 6 and 9 to 11).

According to this structure, since the inclined member 25 having the V-shaped form in the plan view can reinforce the center cross member 24, the subframe 20 can have the high rigidity.

The powertrain mount 50 can be arranged on the center cross member 24 such that the powertrain mount 50 avoids the vehicle-width direction load transmitting path transmitting the load along the center cross member 24 and the inclined-direction load transmitting path transmitting, in an X-shaped fashion in a plan view, the load to the inclined member 25 through the center cross member 24. This allows the compact arrangement thereof while preventing the load from affecting the powertrain mount 50.

In summary, the powertrain mount 50 can be arranged in a compact fashion while increasing the rigidity of the subframe 20.

Also, the front edge of the center cross member 24 forms the vehicle-width direction load transmitting path (arrows α2 and β2) linearly connecting the lower arm supports 22d supporting the arms (lower arms 40) of the left and right suspensions, and the mount attaching portion 51 is arranged behind this path (arrows α2 and β3, see FIGS. 3 and 4).

According to this structure, the lower arm supports 22d and the front edge of the center cross member 24 are arranged in the same position in the front-rear direction. In this case, the load applied through the lower arm supports 22d can be transmitted in the vehicle-width direction through the vehicle-width direction load transmitting path, and the vehicle-width direction rigidity in the ordinary state can be increased.

The mount attaching portion 51 is formed of the expanded portion 24e formed by expanding the central portion of the center cross member 24 rearward beyond the rear edges of the left and right side portions thereof, and the expanded portion 24e is coupled to the inclined member 25 (see FIGS. 1 to 6 and 9 to 11).

According to this structure, the center cross member 24 provided with the powertrain mount 50 can be compact in the front-rear direction, and the expanded portion 24e coupled to the inclined member 25 can be used as the inclined-direction load transmitting path. Therefore, the load in the inclined direction can be smoothly transmitted along the expanded portion 24e, and consequently the light weight and high rigidity can be achieved.

The left and right ends of the center cross member 24 extend obliquely outward and forward, and the front support 22d1 among the lower arm supports 22d1 and 22d2 supporting each of the arms (lower arms 40) of the left and right suspensions extends forward beyond the front edge of the center cross member 24 (see FIGS. 1 to 6 and 9 to 11).

According to this structure, even when the lower arm supports 22d are arranged in front of the front edge of the center cross member 24, the left and right ends extended obliquely outward and forward can ensure the vehicle-width direction load transmitting path along the front edge of the center cross member 24 and the inclined-direction load transmitting path in the center cross member 24. Therefore, the front edge of the center cross member 24 can be arranged relatively rearward with respect to the lower arm supports 22d, and the rearward arrangement of the center cross member 24 can increase the arrangement space for the powertrain PT.

In summary, the load transmission rigidity in the center cross member 24 can be increased and, at the same time, the arrangement space of the powertrain PT can be increased.

The left and right rear ends of the inclined member 25 are coupled to the vehicle body (see FIGS. 1 to 6, and FIGS. 9 to 12).

According to this structure, the load in the inclined direction can be directly transmitted to the vehicle body side without passing through the side members 21F and 21R so that the transmission rigidity to the inclined-direction load transmitted to the vehicle body can be increased.

At the left and right of the mount attaching portion 51, the internal partitions 52 formed of the longitudinal walls extending in the front-rear direction are arranged, respectively (see FIG. 10).

According to this structure, the inclined-direction load of the center cross member 24 can be smoothly transmitted in the X-shaped fashion to the inclined member 25 through the internal partitions 52.

The longitudinal walls 24e1 extending in the front-rear direction are formed at the left and right outer shells of the mount attaching portion 51, respectively (see FIGS. 3 and 5).

According to this structure, the inclined-direction load of the center cross member 24 can be smoothly transmitted in the X-shaped fashion to the inclined member 25 through the longitudinal walls 24e1.

The openings S are formed by the center cross member 24, the inclined member 25 and the side members 21R (see FIGS. 2 to 6 and FIGS. 10 and 11).

According to this structure, since the formation of the opening S can eliminate the portion other than the load transmission paths, the weight of the subframe 20 can be reduced.

Since the surface area of the subframe 20 can be reduced, noises and vibrations of the subframe 20 can be reduced.

The mount attaching portion 51 is provided at the front surface with the opening 24d for inserting the link 55 coupled to the powertrain mount 50, and particularly the opening 24d is located in the position where it does not intersect imaginary lines L connecting the left and right side ends of the front edge of the center cross member 24 to the portion coupled to the inclined member 25 and is spaced rearward from the front edge described above. The opening 24d is vertically spaced from the front edge described above (see FIG. 3).

According to this structure, the opening 24d is spaced vertically (upward in this embodiment) from the front edge of the center cross member 24 where the vehicle-width direction load concentrates. Therefore, the vehicle-width direction load can be transmitted without partially cutting the load on the front surface of the center cross member 24 by the opening 24d. Accordingly, this structure is preferable in view of both the improvement of the load transmission rigidity with respect to the vehicle-width direction load of the center cross member 24 and the achievement of the compact structure in the front-rear direction.

At the front surface of the center cross member 24, the bypass passage 24g extending in the vehicle-width direction and bypassing the front edge described above is arranged on the side opposite to the front edge described above with the opening 24d interposed therebetween (see FIGS. 1, 3, 5, 6 and 9).

According to the structure, a part of the vehicle-width direction load can be partially transmitted to the bypass passage 24g, and the load can be dispersed to the upper and lower sides of the opening 24d. This can reduce the load applied to the portion between the opening 24d and the front edge of the center cross member 24, and consequently can increase the load transmission rigidity against the vehicle-width direction load of the center cross member 24.

[Second Embodiment]

Figure 13:
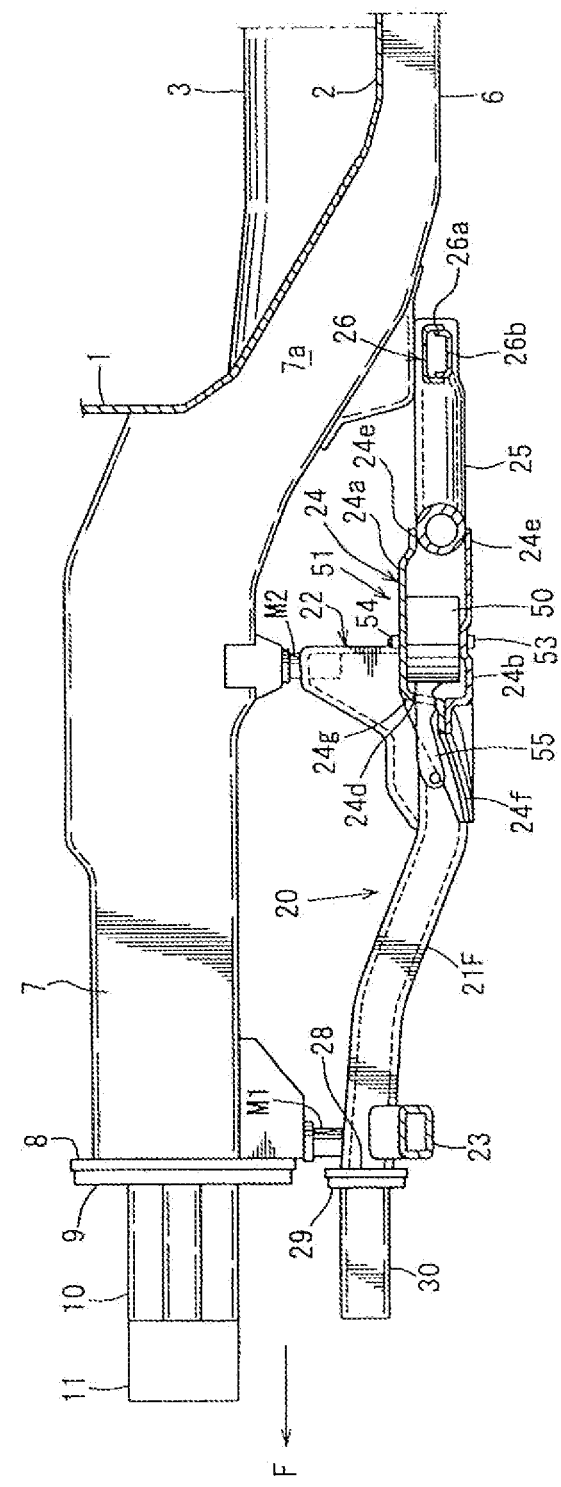
FIG. 13 is a side view illustrating a second embodiment of a front subframe structure of an automobile.
Figure 14:
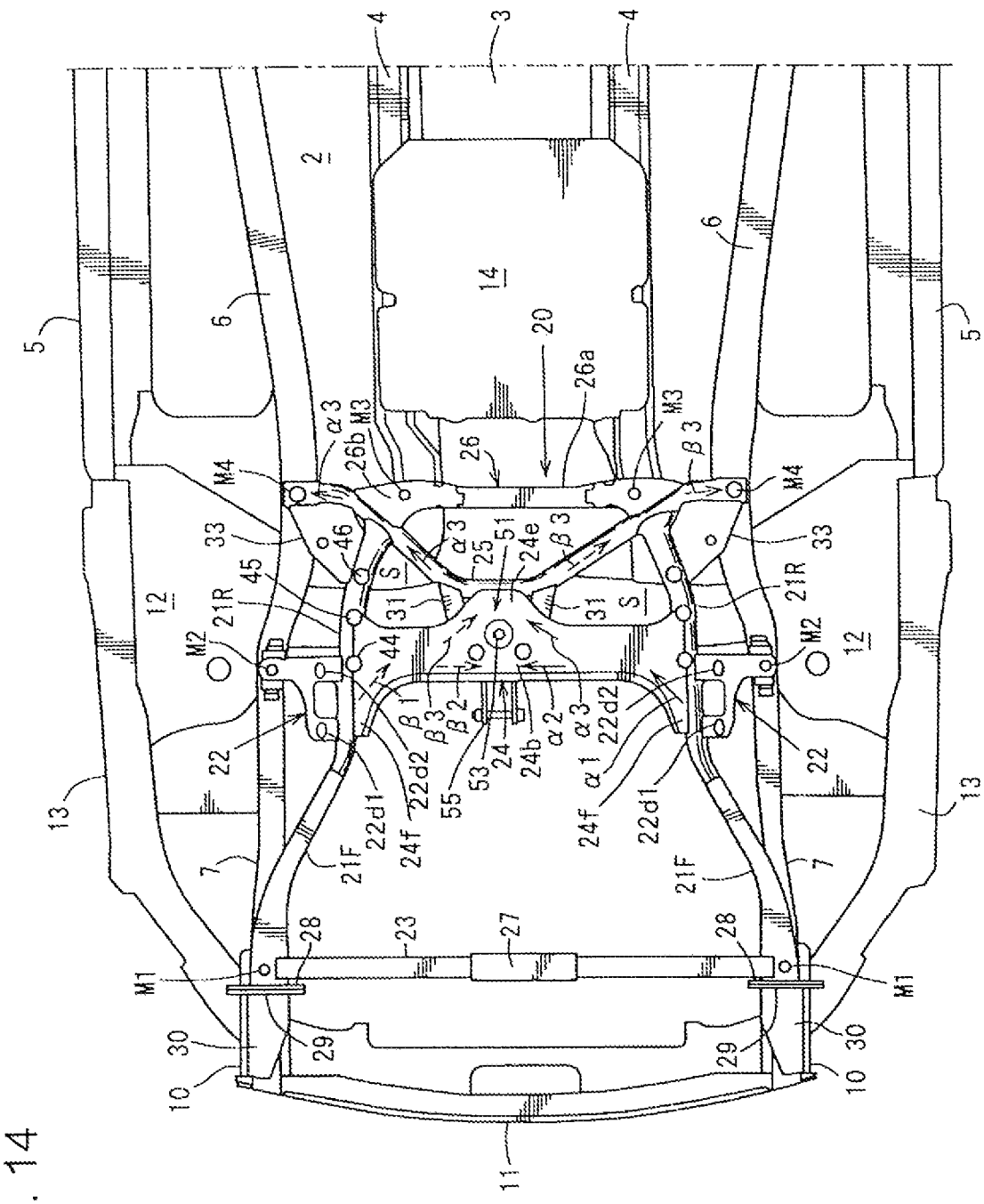
FIG. 14 is a bottom view of the front subframe structure in FIG. 13.
Figure 15:
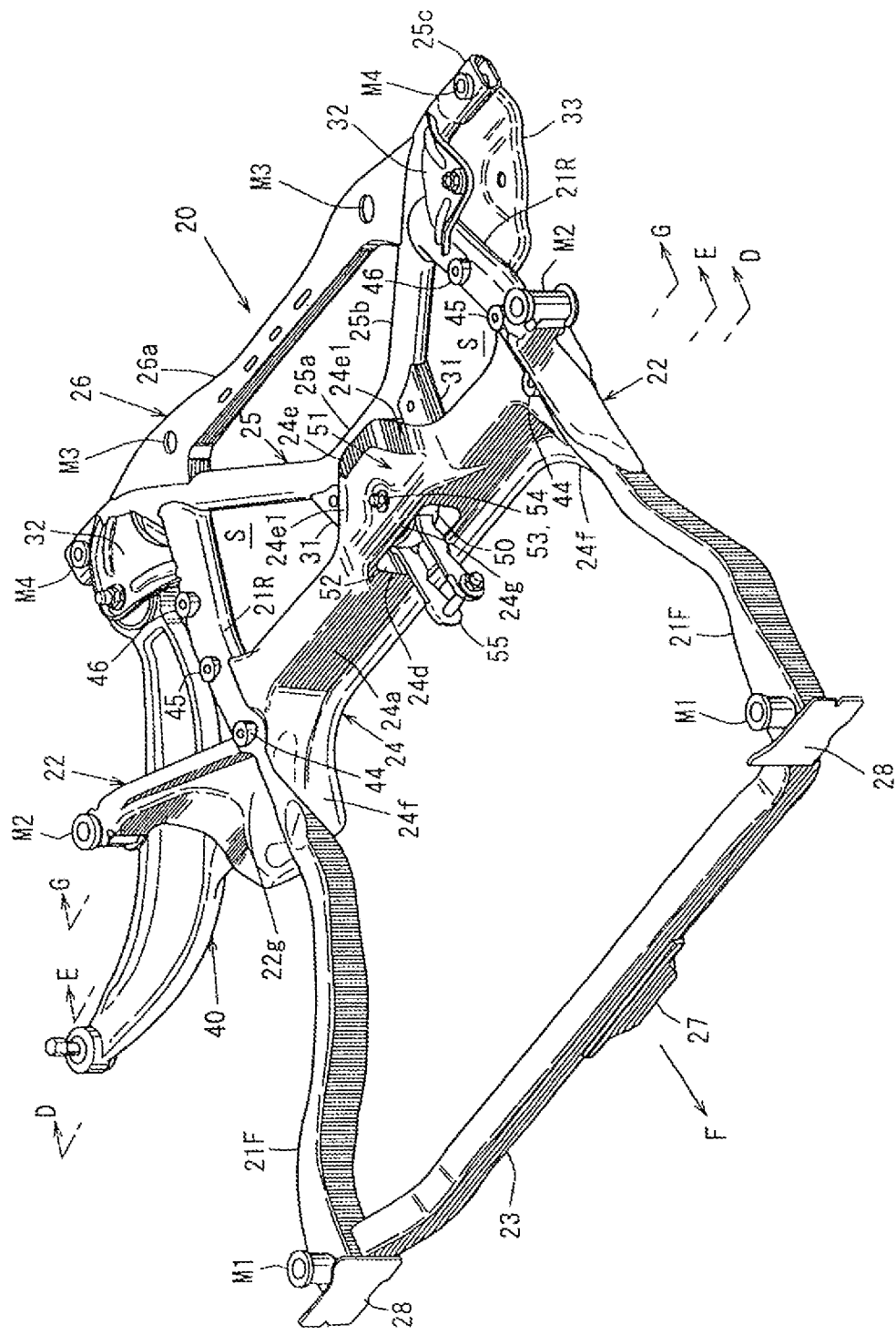
FIG. 15 is a perspective view of the front subframe structure.
Figure 16:
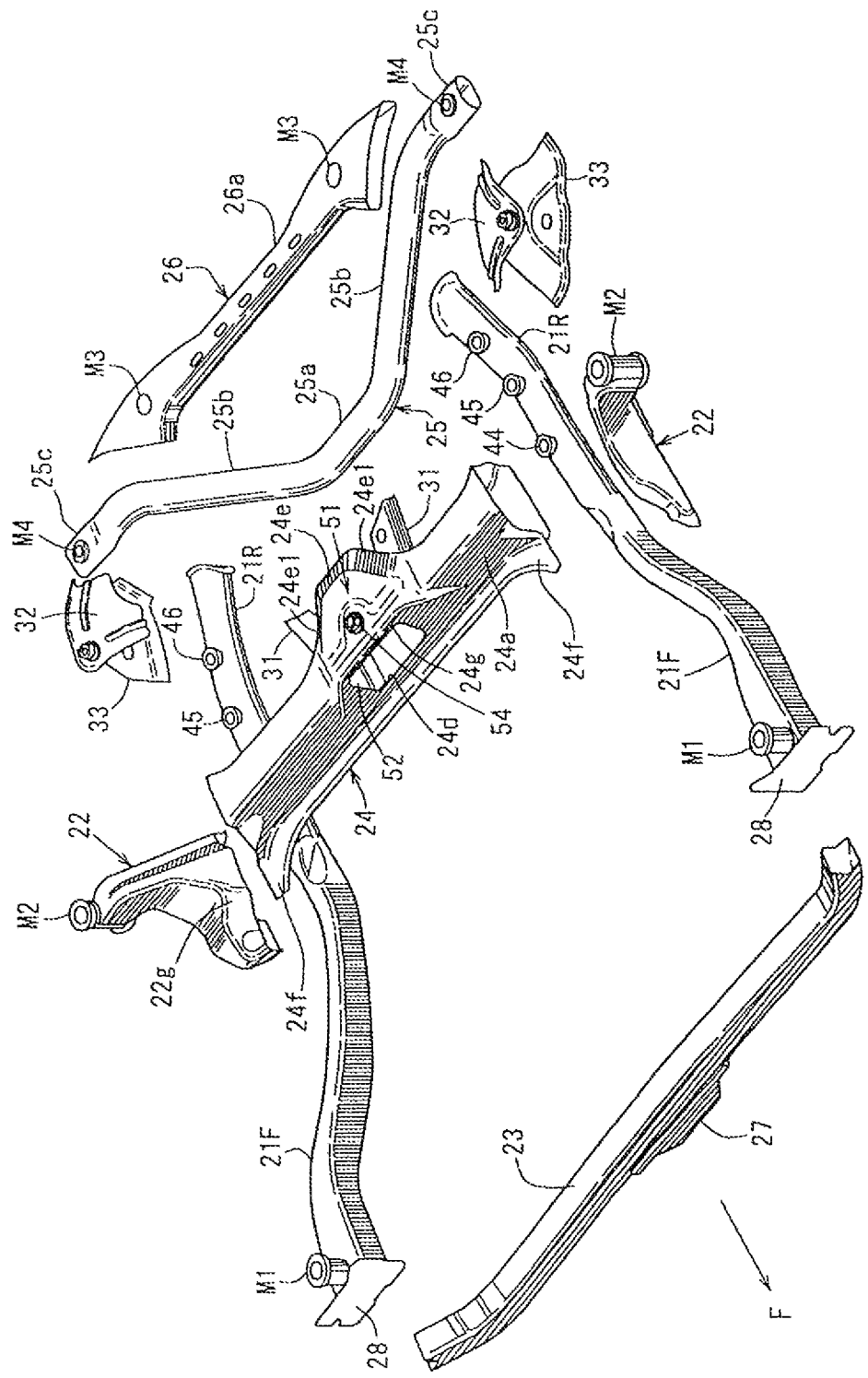
FIG. 16 is an exploded perspective view of the front subframe structure.
Figure 17:
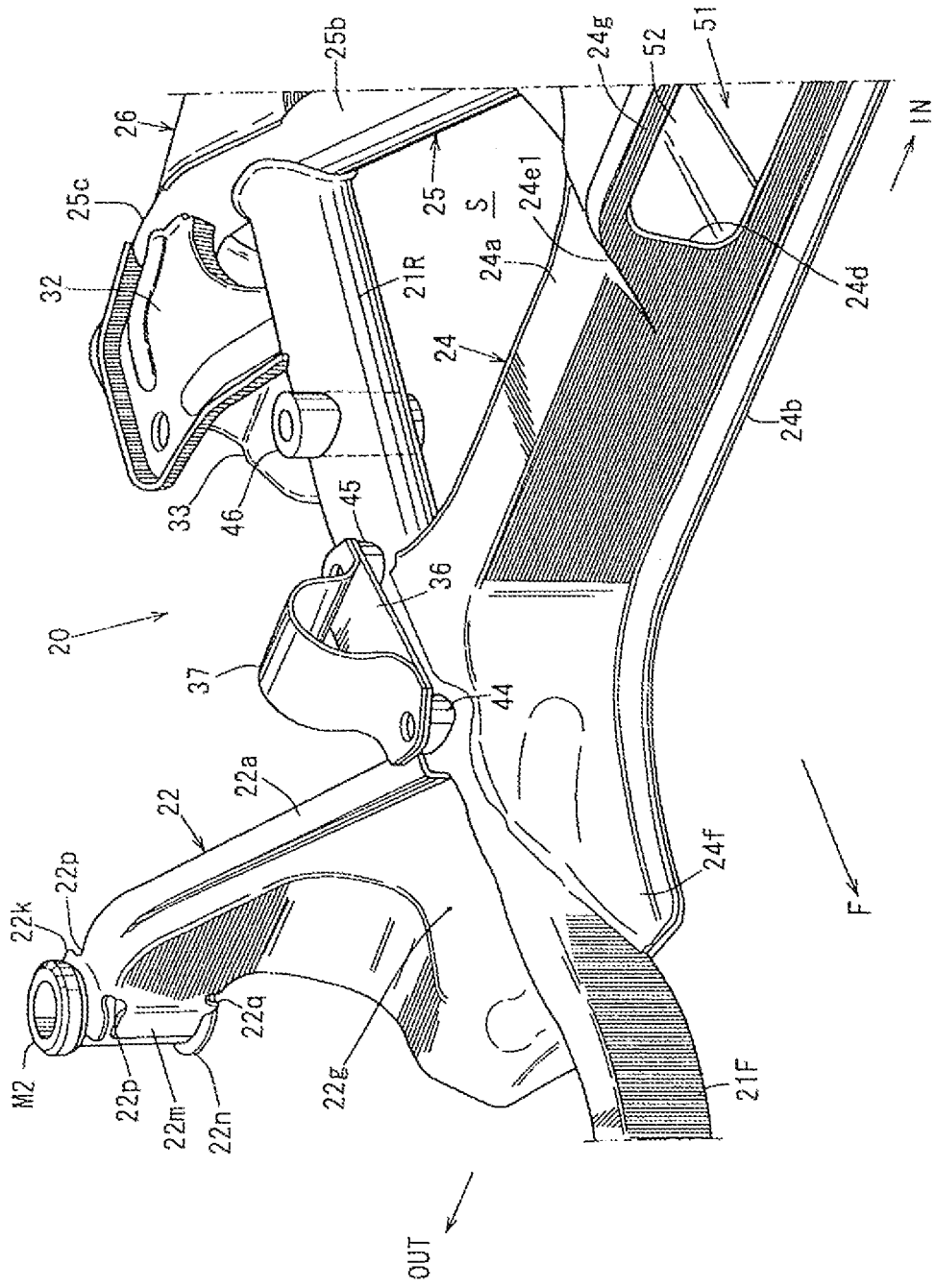
FIG. 17 is a fragmentary enlarged perspective view of FIG. 15.
Figure 18:
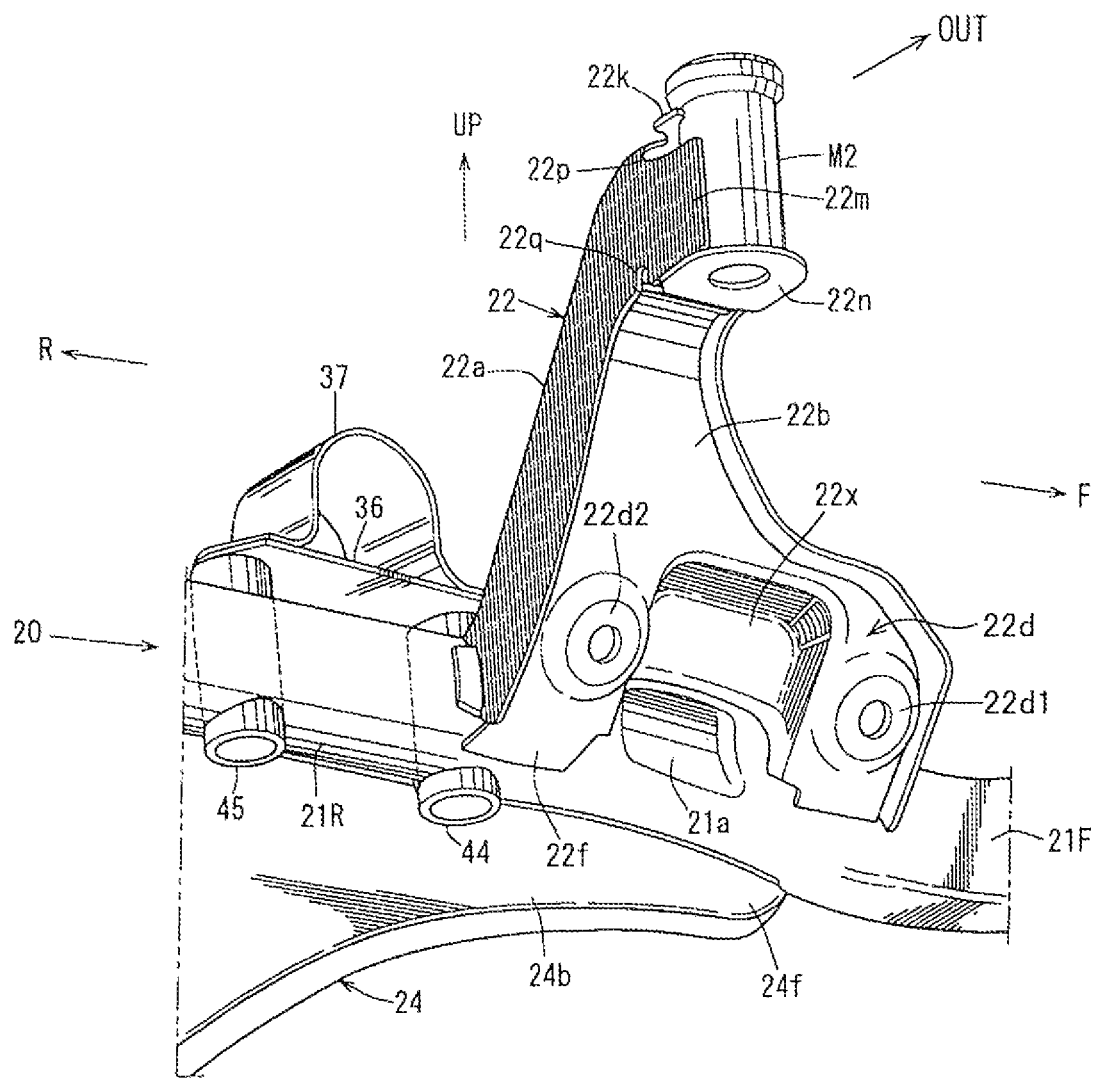
FIG. 18 is a perspective view of a peripheral structure of a vehicle body attaching portion in FIG. 17 viewed obliquely upward.
Figure 19:
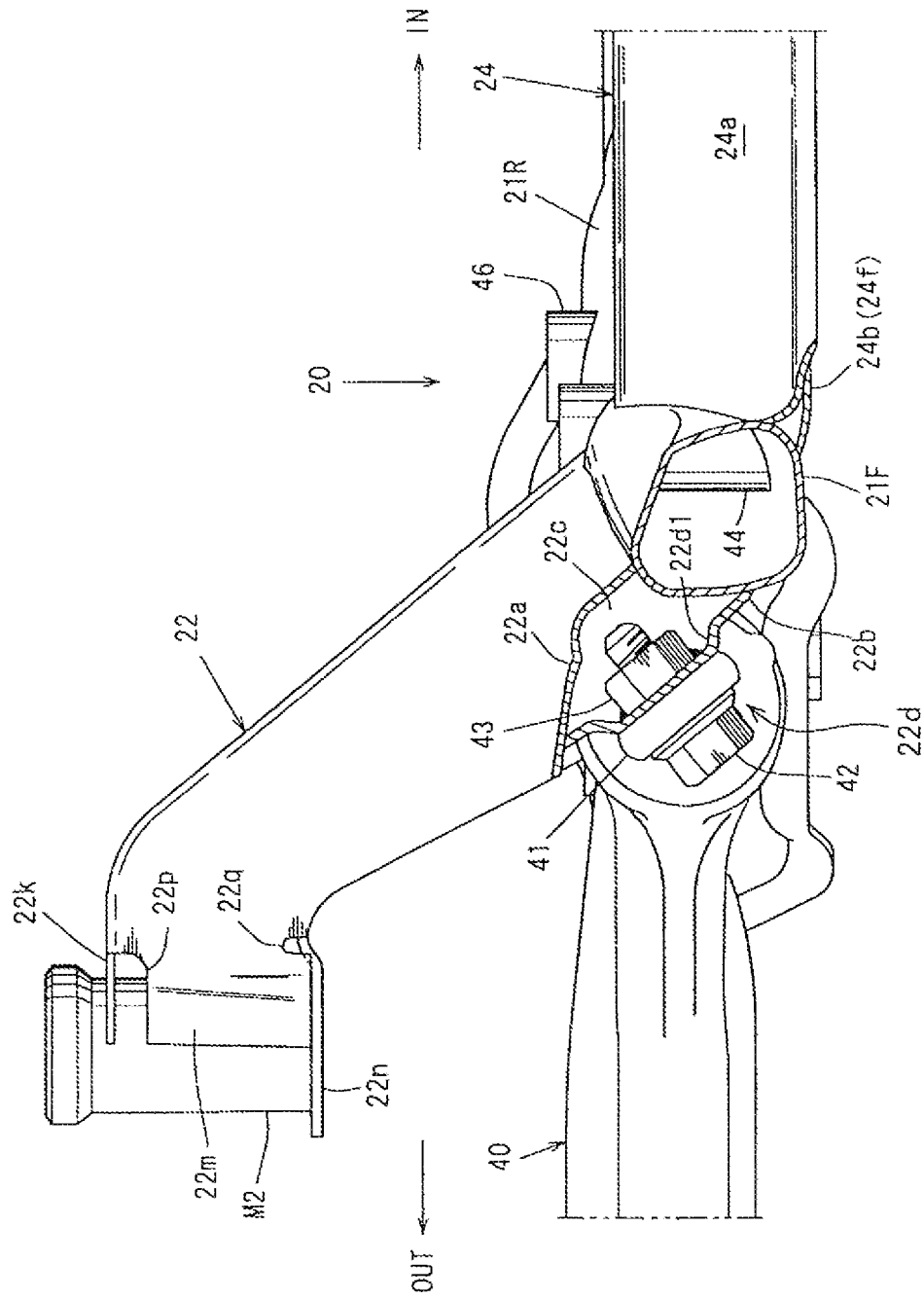
FIG. 19 is a view taken along line D-D in FIG. 15.
Figure 20:
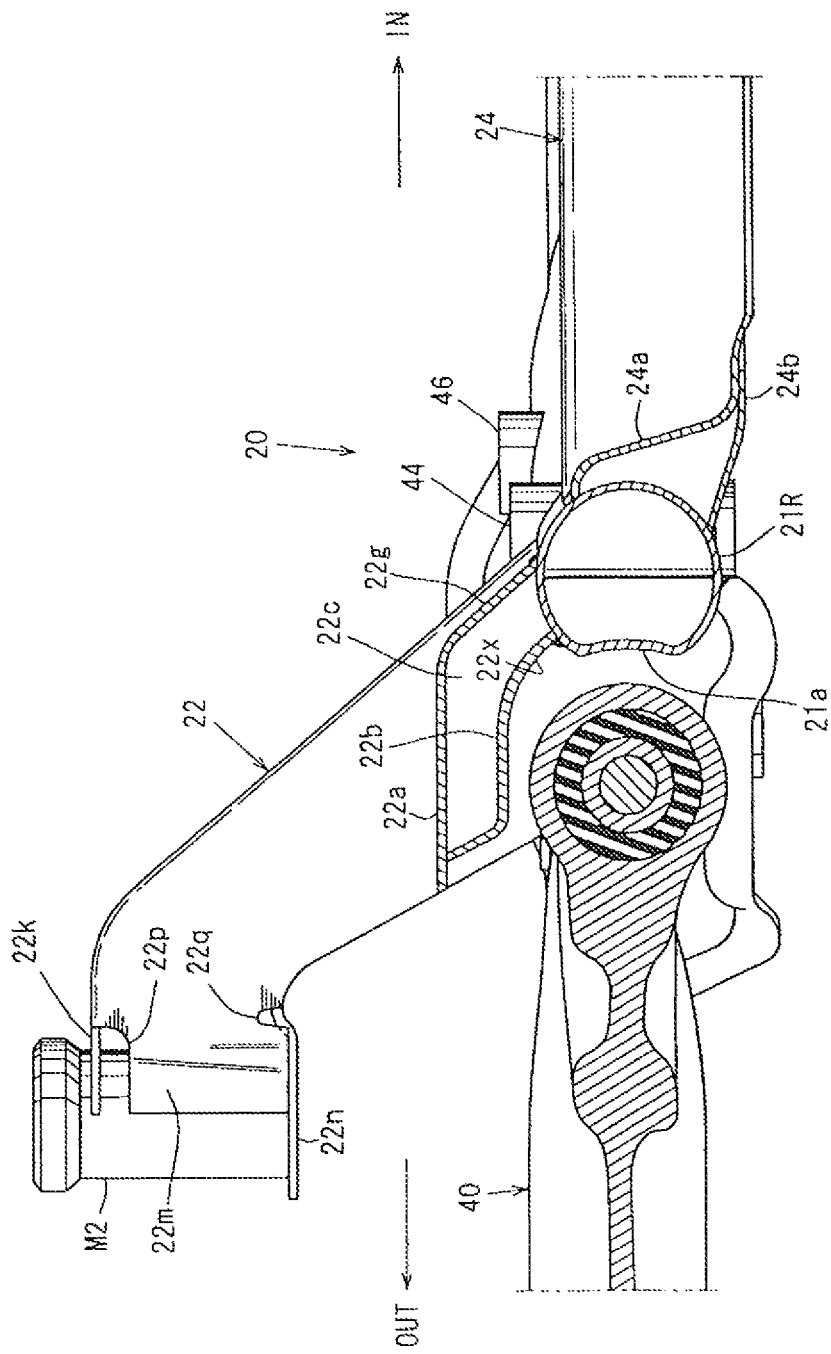
FIG. 20 is a view taken along line E-E in FIG. 15.
Figure 21:
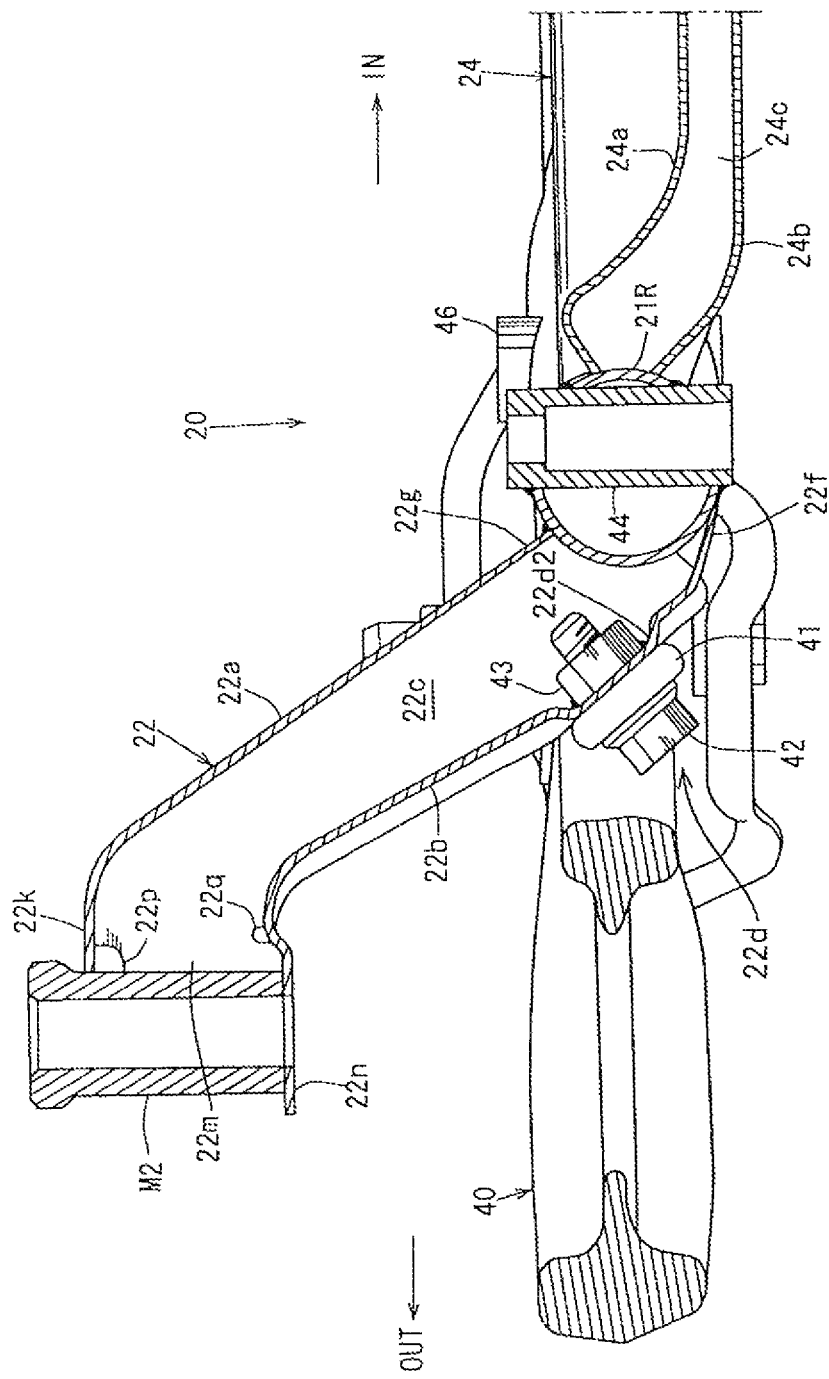
FIG. 21 is a view taken along line G-G in FIG. 15.

FIGS. 13 to 21 illustrate a second embodiment of a front subframe structure of an automobile. FIG. 13 is a side view thereof, FIG. 14 is a bottom view of FIG. 13, FIG. 15 is a perspective view of the subframe structure, FIG. 16 is an exploded perspective view thereof, FIG. 17 is a fragmentary enlarged perspective view of FIG. 15, FIG. 18 is a perspective view of a peripheral structure of a tower viewed upward serving as a vehicle body attaching portion illustrated in FIG. 17, FIG. 19 is a cross-section view taken along line D-D in FIG. 15 and illustrating a right side of a vehicle, FIG. 20 is a cross-section view taken along line E-E in FIG. 15 and illustrating the right side of the vehicle, and FIG. 21 is a cross-section view taken along line G-G in FIG. 14 and illustrating the right side of the vehicle.

In the FIGS. 13 to 21, the same portions as those in FIGS. 1 to 12 bear the same reference numbers, respectively.

In the embodiment illustrated in FIGS. 13 to 21, side members 21F and 21R on the front and rear sides are integrally coupled together in the front-rear direction. Each of the side members 21F and 21R can be integrally formed by hydroforming a metal pipe to provide a front side having a quadrat shaped cross section and a rear side having a circular-pipe form.

As illustrated in the sectional view of FIG. 21, a tower 22 of this embodiment likewise includes a mount bracket upper 22a and a mount bracket lower 22b. The tower 22 has a closed cross-section space 22c extending in the vehicle-widthwise outward and upward from the lower surfaces of the side members 21F and 21R. At the lower portion of the closed cross-section space 22c, as illustrated in FIGS. 21 and 18, front and rear lower arm supports 22d1 and 22d2 are arranged, and a lower surface portion 22f at its lower end is coupled by welding to the lower surface of the side member 21R.

As illustrated in the perspective view of FIG. 17, each of the left and right towers 22 (only the right tower 22 is illustrated in the drawings) is welded and coupled at an upper surface portion 22g of its lower portion to the upper surfaces of the side members 21F and 21R.

As illustrated in FIGS. 18 and 21, the lower arm supports 22d1 and 22d2 at the front and rear of the tower 22 are formed at the side surfaces on the vehicle-widthwise outer sides. This vehicle-widthwise outer side surface portion, i.e., the mount bracket lower 22b is linearly inclined and formed between the side members 21F and 21R and the front side frame 7 as illustrated in FIG. 21.

In this embodiment, as illustrated in FIG. 18, the front and rear lower arm supports 22d1 and 22d2 of the tower 22 are likewise configured to form the front support 22d1 and the rear support 22d2 by dividing the closed cross-section space 22c into front and rear portions.

As illustrated in the bottom view of FIG. 14, a center cross member 24 is arranged by being shifted rearward with respect to the tower 22 so that the position thereof in the vehicle front-rear direction overlaps that of the rear support 22d2 of the tower 22 throughout its entire length in its vehicle-width direction.

Moreover, as illustrated in FIG. 14, a center cross member 24 has the left and right ends, each of which is extended in the vehicle front-rear direction toward the mount of the tower 22, and more specifically is inclined toward the front lower arm support 22d1 so that an extension 24f extending obliquely outward and forward is formed. This extension 24f is coupled to the side members 21F and 21R as illustrated in FIGS. 14, 17 and 18. On the rear side of the center cross member 24, i.e., the opposite side of the center cross member 24 in the vehicle front-rear direction to the side where the extension 24f is formed, an expanded portion 24e protruding rearward from the rear edges of the left and right side portions is formed at the vehicle-widthwise middle portion. This expanded portion 24e is coupled to an inclined member 25 as illustrated in FIGS. 14 and 15.

The center cross member 24 has a closed cross section defined by the center cross member upper 24a and center cross member lower 24b, and is configured to relieve a stress concentration of the load in the vehicle-widthwise direction by coupling the extension 24f to the side members 21F and 21R.

Further, as illustrated in FIGS. 14, 18 and 21, in the position where the center cross member 24 overlaps the tower 22 in the vehicle front-rear direction, the side member 21R is provided with a stabilizer attaching bushing 44 which vertically extends through the side member 21R, couples the upper and lower surfaces of the side member 21R by welding and serves as an accessory attaching bushing.

This bushing 44 and a bushing 45 immediately behind it are configured to attach a stabilizer as an accessory to them through stabilizer support brackets 36 and 37.

One of the pair of front and rear stabilizer attaching bushings 44 and 45, i.e., the front bushing 44 is arranged in the position where it overlaps with both the center cross member 24 and the tower 22 as illustrated in FIG. 14, and each of these front and rear bushings 44 and 45 vertically extends through the side member 21R, and is coupled by welding to its upper and lower surfaces.

The front bushing 44 overlaps with the rear lower arm support 22d2 of the tower 22. Owing to this structure, the stabilizer is attached by passing it in the vehicle-width direction, and further the side members 21F and 21R, and particularly, the rear side member 21R is prevented from collapsing of its closed cross-section space when inputting load.

Further, as illustrated in FIG. 18, the vehicle-widthwise outer end of the center cross member lower 24b forming the center cross member 24 of the closed cross-section structure is coupled to the lower surfaces of the side members 21F and 21R to an extent that it neighbors to the bushings 44 and 45 but is not affected by the heat of the welding, and the tower 22 is coupled to the center cross member 24 through the bushing reinforcing portions of the side members 21F and 21R.

In FIGS. 18 and 20, 21a indicates a concavity formed in the side member 21R for the purpose of avoiding the interference with a lower arm 40.

As described above, the front subframe structure of the automobile of the embodiment illustrated in FIGS. 13 to 21 is a the subframe structure of the automobile including a subframe 20 arranged under and between the left and right front side frames 7 arranged in the front portion of the vehicle. Particularly, the subframe 20 has the left and right tubular side members 21F and 21R extending in the vehicle front-rear direction, the center cross member 24 arranged between the left and right side members 21F and 21R, and left and right vehicle body attaching portions (see the tower 22) extending upward from the side members 21F and 21R and coupled to the left and right front side frames 7, respectively. The vehicle body attaching portion (tower 22) has, at least at its lower portion, the closed cross-section space 22c extending from the lower surfaces of the side members 21F and 21R to the vehicle-widthwise outer side and the upper side. In a portion of the closed cross-section space 22c, a lower arm support 22d is arranged, and the lower surface portion 22f of its lower end is coupled to the lower surfaces of the side members 21F and 21R (see FIGS. 14 and 21).

According to this structure, the vehicle body attaching portion (tower 22) has the closed cross-section space 22c extending from the lower surfaces of the side members 21F and 21R to the vehicle-widthwise outer side and upward, and the lower surface portion 22f of the lower end of the lower arm support 22d in the portion of the closed cross-section space 22c is coupled to the lower surfaces of the side members 21F and 21R. Therefore, the load applied from the lower arm 40 (particularly, the lateral load at the time of the vehicle turning and the like) can be dispersed to the front side frames 7. Also, through the lower end lower surface portion 22f of the vehicle body attaching portion (tower 22) of the closed cross-section structure, the load can be smoothly transmitted to the lower surfaces of the side members 21F and 21R without collapsing the closed cross-section spaces of the side members 21F and 21R, and the load can be dispersed.

Accordingly, the subframe 20 having a smaller weight and a higher rigidity can be achieved, and noises and vibrations can be reduced. Particularly, deformation of the side members 21F and 21R can be prevented when a lateral load is applied, and weight reduction and improvement of the rigidity feeling can be achieved owing to the reduction in pipe thickness of the tubular side members 21F and 21R made of pipes.

The upper surface portions 22g of the lower portions of the left and right vehicle body attaching portions (see tower 22) are coupled to the upper surfaces of the side members 21F and 21R (see FIGS. 15 and 21).

According to this structure, not only the lower end lower surface portion 22f of the vehicle body attaching portion (tower 22) of the closed cross-section structure but also the upper surface portion 22g of the lower portion of the vehicle body attaching portion (tower 22) is coupled to the upper surfaces of the side members 21F and 21R. Therefore, the collapse of the closed cross-section spaces of the side members 21F and 21R can be prevented better, and the coupling strength of the vehicle body attaching portion (tower 22) to the subframe 20 can be improved.

Further, the center cross member 24 is configured such that the vehicle-widthwise side portion thereof extends in the vehicle front-rear direction, is inclined toward the mount of the vehicle body attaching portion (tower 22) (see the extension 24θ, and is coupled to the side members 21F and 21R, while the inclined member 25 is coupled to the vehicle-widthwise middle portion on the opposite side in the vehicle front-rear direction to the vehicle-widthwise side portion (see FIG. 14).

According to this structure, both ensuring of the layout property of the center cross member 24 and ensuring of the inclined load transmission path can be achieved in a high level.

More specifically, when the right lower arm support 22d applies the load (see solid arrows in FIG. 14), the load can be transmitted from the center cross member 24 to the left inclined member 25. Conversely, when the left lower arm support 22d applies the load (see dotted arrows in FIG. 14), the load can be transmitted from the center cross member 24 to the right inclined member 25, and the inclined load transmission path can be ensured.

Further, the side members 21F and 21R in the position where the center cross member 24 and the vehicle body attaching portion (see tower 22) overlap in the vehicle front-rear direction are provided with the accessory attaching bushing 44 coupling the upper and lower surfaces of the side members 21F and 21R (side member 21R in this embodiment) (see FIGS. 14 and 21).

According to this structure, the side member 21R in the position where the center cross member 24 and the vehicle body attaching portion (tower 22) overlap in the vehicle front-rear direction with each other is provided with the bushing 44 coupling the upper and lower surfaces thereof. Therefore, the bushing 44 can prevent the collapse of the closed cross-section space of the side member 21R better, and the rigidity feeling can be improved while using it also for attaching the accessory (see the stabilizer).

In the embodiment illustrated in FIGS. 13 to 21, other structures, operations and effects are substantially the same as those of the embodiment in FIGS. 1 to 12. In FIGS. 13 to 21, therefore, the same portions as those in FIGS. 1 to 12 bear the same reference numbers, and detailed description thereof is not repeated. However, arrows R in the figures indicate a "rearward" direction of the vehicle, and arrows UP indicate an "upward" direction of the vehicle.

[Third Embodiment]

Figure 22:
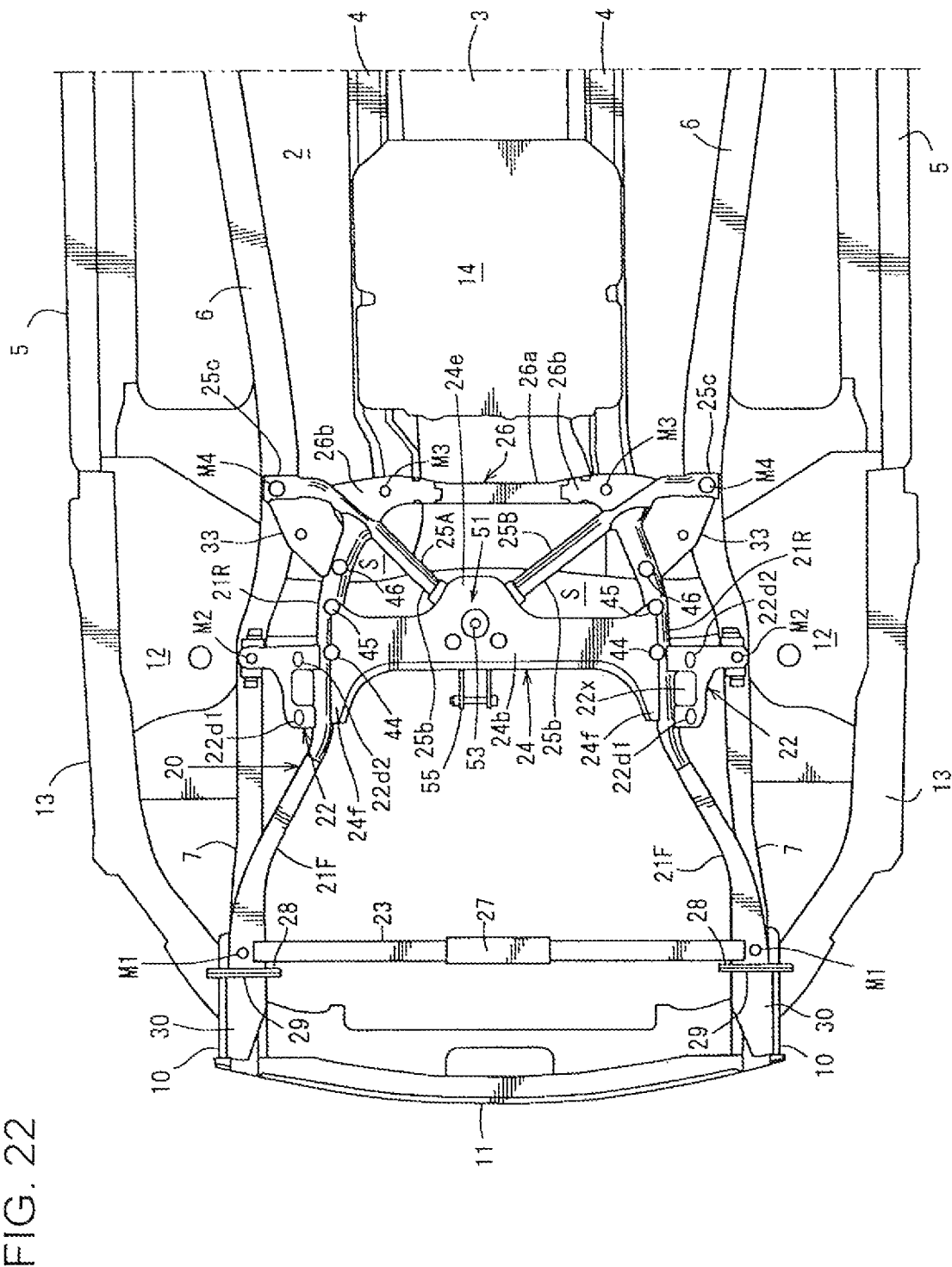
FIG. 22 is a bottom view illustrating a third embodiment of a front subframe structure of an automobile.

FIG. 22 is a bottom view illustrating a third embodiment of a front subframe structure of an automobile.

The first and second embodiments employ the inclined member 25 having a laterally undivided structure and a V-shaped form in a plan view. However, the third embodiment illustrated in FIG. 22 employs a pair of inclined members 25A and 25B of a laterally divided structure.

Each of the inclined members 25A and 25B is a member made of a metal pipe provided with an inclined portion 25b and a rear portion 25c. A front end of each inclined member 25A or 25B is coupled to an inclined longitudinal wall 24e1 of an expanded portion 24e of a center cross member 24, and the rear portion 25c is coupled to a lower surface of a rear portion of a front side frame 7 by a rear mount pipe M4 (so-called No. 4 mount pipe).

When the inclined members 25A and 25B of the laterally divided structure is employed, the embodiment achieves substantially the same operations and effects as those of the first and second embodiments. In FIG. 22, therefore, the same portions as those in the foregoing figures bear the same reference numbers, and detailed description thereof is not repeated.

[Fourth Embodiment]

Figure 23A:
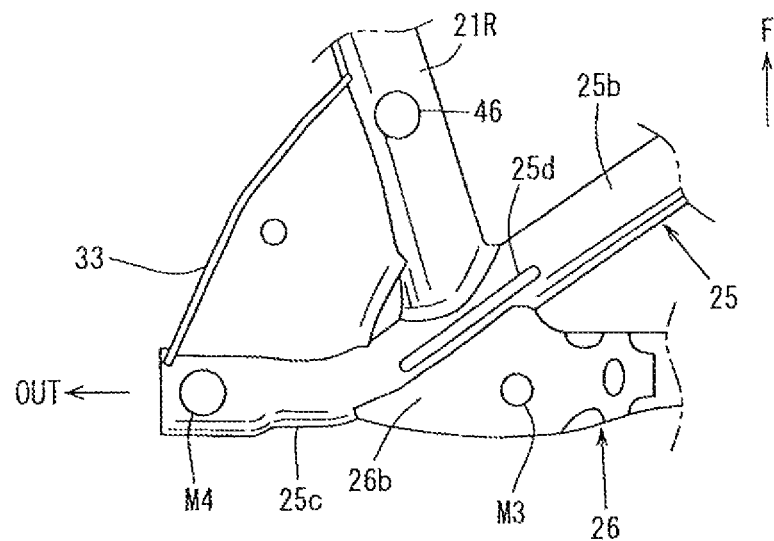
FIG. 23 is a bottom view illustrating a major portion of a fourth embodiment of a front subframe structure of an automobile.
Figure 23B:
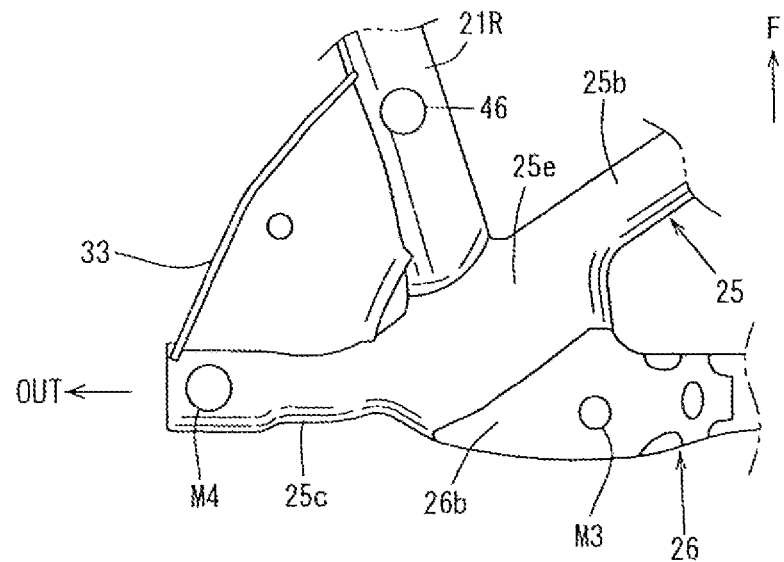

FIG. 23 is a bottom view illustrating a fourth embodiment of a front subframe structure of an automobile.

In an embodiment illustrated in FIG. 23 (a), an inclined member 25 is provided at its lower surface with a bead portion 25d extending in its lengthwise direction (in the vehicle-width direction), and the bead portion 25d is arranged in the position corresponding to the connection portion of a side member 21F.

According to this structure, the bead portion 25d can increase the rigidity in its lengthwise direction (vehicle-width direction) of the inclined member 25. Further, at the time of vehicle collision (forward collision), the bead portion 25d extending perpendicularly to the load application direction can promote the collapse of the inclined member 25.

In an embodiment illustrated in FIG. 23 (b), the inclined member 25 has an expanded portion 25e having a larger width in the front-rear direction than other portions, and this expanded portion 25e is arranged in the position corresponding to the connection portion to the side member 21F.

This structure can further increase the collapsing width of the inclined member 25 owing to the expanded portion 25e, and therefore can operate the releasing means more reliably.

In the embodiment illustrated in FIG. 23, other structures, operations and effects are substantially the same as those of the foregoing embodiments. In FIG. 23, therefore, the same portions as those in the foregoing figures bear the same reference numbers, and detailed description thereof is not repeated.

When the expanded portion 25e is formed, the thickness of the expanded portion 25e may be smaller than that of the other portion of the inclined portion 25b. In this case, a section modulus of the expanded portion 25e increases so that the inclined member 25 can have a higher rigidity in the axial direction to cancel the lowering of the axial rigidity due to the reduction in thickness.

[Fifth Embodiment]

Figure 24:
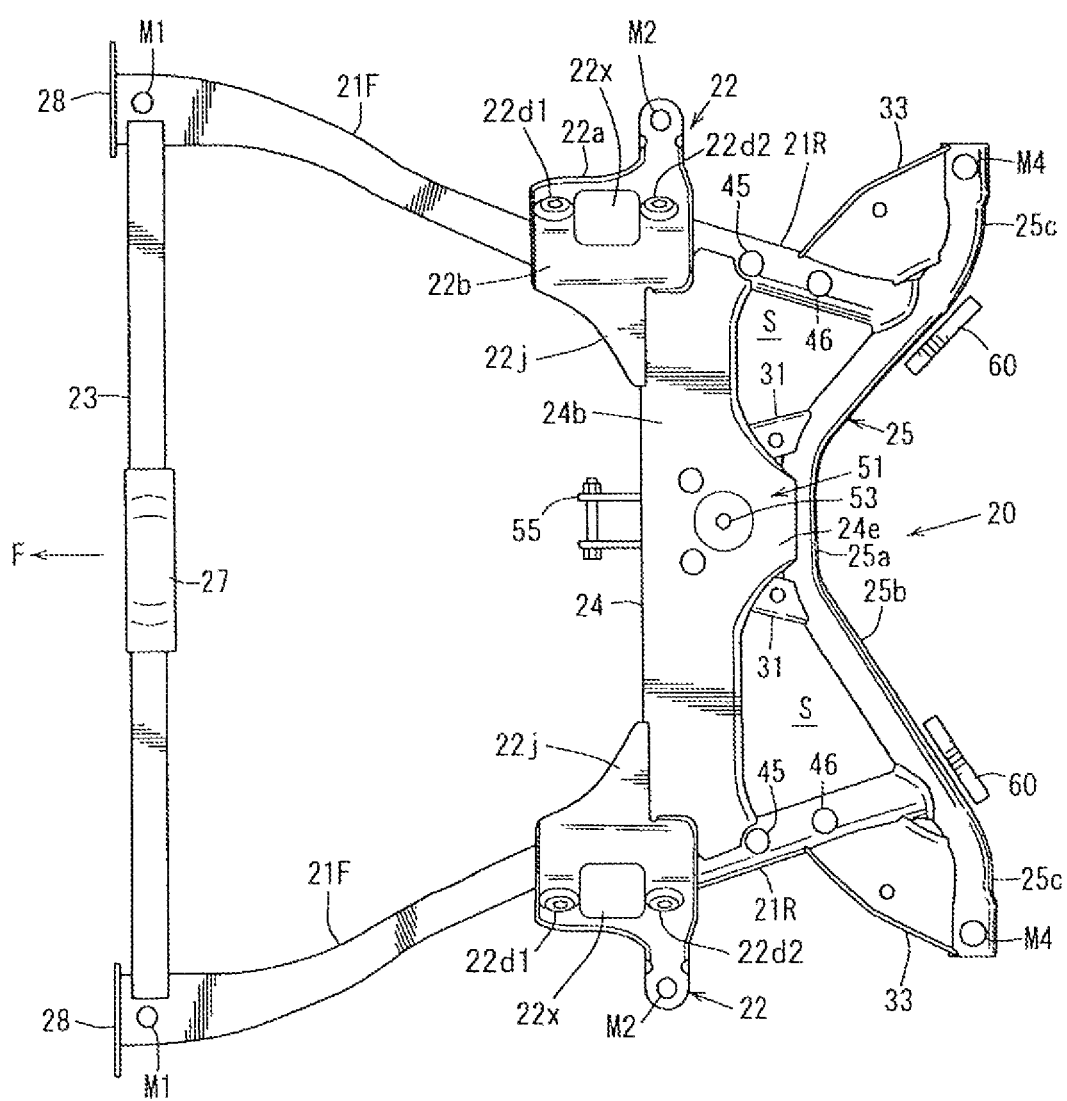
FIG. 24 is a bottom view illustrating a fifth embodiment of a front subframe structure of an automobile.

FIG. 24 illustrates a fifth embodiment of a front subframe structure of an automobile, and FIG. 24 is a bottom view of the same.

In the first to fourth embodiments, the rear cross member 26 and the mount point M3 are arranged on the side opposite to the connection portion where the inclined member 25 and the side member 21R are connected. However, the fifth embodiment illustrated in FIG. 24 employs a structure having a vehicle-body-side contact portion 60 which protrudes downward from the vehicle body side and is located on the side opposite to the connection portion described above.

In the embodiment illustrated in FIG. 24, a vehicle-body-side contact portion 60 is arranged on the vehicle body side by a manner such as joining and coupling it to the lower surface of the vehicle body, or integrally forming it.

In this embodiment, when a collision load is applied through the front side of the vehicle at the time of the vehicle collision (front collision), a front side frames 7 starts deformation, and simultaneously a rear surface of a rear side of an inclined member 25 moves toward the vehicle-body-side contact portion 60 and comes into contact with it.

At this time, the rear surface on the rear side of the inclined member 25 is strongly held by the vehicle-body-side contact portion 60 owing to the contact with it, so that the inclined member 25 enters a state in which it is strongly pinched in the vehicle front-rear direction by a side member 21R and the vehicle-body-side contact portion 60. Consequently, the front surface on the rear side of the inclined member 25 is collapsed in the front-rear direction by the side member 21R.

As described above, the front subframe structure of the automobile of the embodiment illustrated in FIG. 24 has the vehicle-body-side contact portion 60 arranged such that when it receives the collision load that allows deformation of at least the portion opposite to the connection portion where the inclined member 25 is connected to the side member 21R, and particularly the portion (front side frame 7) of the vehicle body in which a subframe 20 is arranged, the vehicle-body-side contact portion 60 comes into contact with the surface (rear-side rear surface) on a vehicle cabin side of the inclined member 25 (see FIG. 24).

According to this structure, at the time of vehicle collision, since the portion opposite to the connection portion is strongly held by the vehicle-body-side contact portion 60 owing to the contact with it, the inclined member 25 attains the state where it is strongly pinched in the vehicle front-rear direction by the side member 21R and the vehicle-body-side contact portion 60. Therefore, the side member 21R and the vehicle-body-side contact portion 60 cooperate to collapse easily the inclined member 25.

In the embodiment illustrated in FIG. 24, the other structures, operations and effects are substantially the same as those of the embodiment in FIGS. 1 to 12. In FIG. 24, therefore, the same portions as those in the foregoing figures bear the same reference numbers, and detailed description thereof is not repeated.

[Sixth Embodiment]

Figure 25:
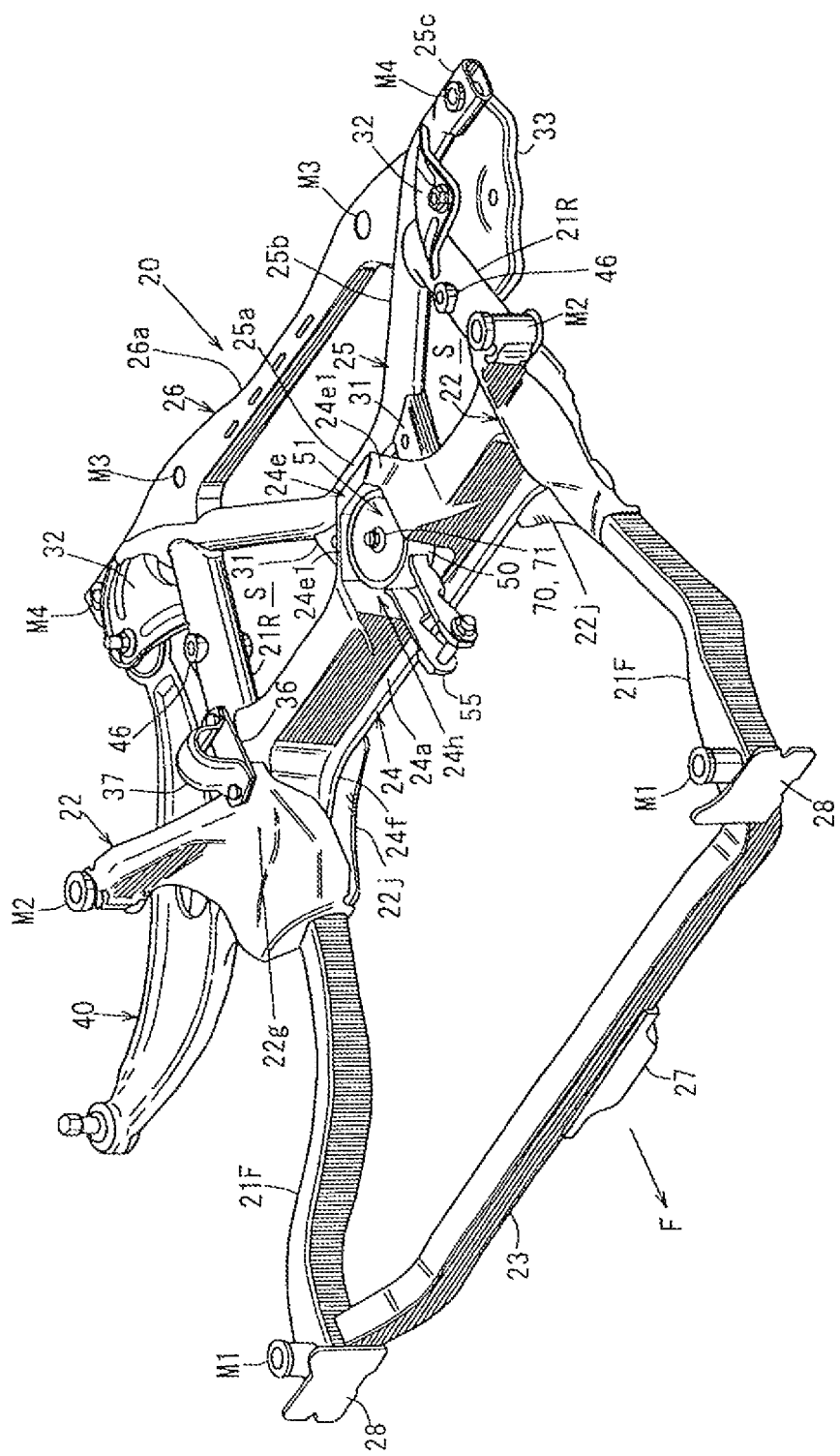
FIG. 25 is a perspective view illustrating a sixth embodiment of a front subframe structure of an automobile.

FIG. 25 is a bottom view illustrating a sixth embodiment of a front subframe structure of an automobile.

In the embodiment illustrated in FIG. 25, a center cross member upper 24a is provided at its vehicle-widthwise central portion with a concave portion 24h concaved downward from the front surface of a center cross member 24 to an expanded portion 24e. This concave portion 24h forms a mount attaching portion 51.

A powertrain mount 50 is provided at its central portion with an inner cylinder which is coupled and fixed to a bottom of the concave portion 24h by fastener members such as a bolt 70 and a nut 71, and thereby is attached in a space (i.e., a space of the concave portion 24h in this example) of the mount attaching portion 51. Thus, the center cross member 24 accommodates the powertrain mount 50. A link 55 attached to a rear portion of a powertrain PT extends through a front portion of the concave portion 24h, and is coupled to the powertrain mount 50.

As described above, the structure in which the concave portion 24h formed on the expanded portion 24e forms the mount attaching portion 51 achieves the substantially same operation and effect as those of the first to fifth embodiments already described. In FIG. 25, therefore, the same portions as those in the foregoing figures bear the same reference numbers, and detailed description thereof is not repeated.

In connection with correspondence between the structure of the invention and the foregoing embodiments, the cross member of the invention corresponds to the center cross member 24 in the embodiments, and similarly, the arm support corresponds to the lower arm support 22d (22d1 and 22d2). The invention is not restricted only to the structures of the foregoing embodiments.

The invention can be summarized as follows.

A front subframe structure of an automobile of the invention includes a pair of left and right side members extending in a vehicle front-rear direction, a cross member of a closed cross-section structure extending in a vehicle-width direction to couple the a pair of left and right side members, an inclined member having a pair of left and right inclined portions extending obliquely, in a plan view, outward in a vehicle-widthwise direction and toward a rear of the vehicle from a rear portion of a vehicle-widthwise middle portion of the cross member, and an attaching portion of a powertrain mount housed in the cross member and located behind a front edge of the cross member and in front of a coupling portion between the inclined member and the cross member.

According to the structure described above, the inclined member having a V-shaped form in a plan view can reinforce the cross member. Therefore, the front subframe can have a high rigidity.

Further, the powertrain mount can be accommodated in the cross member while avoiding the vehicle-width direction load transmitting path for transmitting the load along the cross member and the inclined-direction load transmitting path transmitting the load in the X-shaped fashion in the plan view to the inclined member through the cross member. In that connection, the powertrain mount can be compactly arranged while preventing an influence of the load from being exerted on the powertrain mount.

In summary, the rigidity of the front subframe can be increased, and further the powertrain mount can be arranged compactly while preventing the influence of the load from being exerted on the powertrain mount.

In the embodiment of the invention, the arm supports supporting the arms of the left and right suspensions are arranged on the left and right ends of the cross member.

According to the above structure, the load is applied from the arm supports of the left and right suspensions to the left and right ends of the cross member. However, the powertrain mount can be arranged compactly while preventing the influence of this load from being exerted on the powertrain mount.

In one embodiment of the invention, the front edge of the cross member forms the vehicle-width direction load transmission path linearly connecting the left and right arm supports, and the attaching portion is arranged behind this path.

According to the above structure, the arm support and the front edge of the cross member are arranged on the same position in the front-rear direction. In this case, the load applied through the arm support can be transmitted in the vehicle-width direction through the vehicle-width direction load transmitting path, so that the vehicle-width direction rigidity in the ordinary state can be increased.

In one embodiment of the invention, the left and right ends of the cross member extend obliquely outward and forward, the arm support includes the front and rear supports, and the front support is arranged in front of the front edge of the cross member.

According to the above structure, even when the arm support is arranged in front of the front edge of the cross member, the left and right ends of the cross member extended obliquely outward and forward can ensure the vehicle-width direction load transmission path along the front edge of the cross member and the inclined-direction load transmission path in the cross member. Therefore, the front edge of the cross member can be arranged relatively rearward with respect to the arm support, and the rearward arrangement of the cross member can increase the space for arranging the powertrain.

In summary, the space for arranging the powertrain can be increased while increasing the load transmission rigidity of the cross member.

In one embodiment of the invention, the attaching portion is formed of an expanded portion formed by expanding a vehicle-widthwise middle portion of the cross member rearward beyond rear edges of left and right side portions, and the expanded portion is coupled to the inclined member.

According to the above structure, the cross member provided with the powertrain mount can be compact in the front-rear direction, and further the expanded portion coupled to the inclined member can be used as the inclined-direction load transmission path. Therefore, the inclined-direction load can be smoothly transmitted along the expanded portion. Consequently, the light weight and the high rigidity can be achieved.

In one embodiment of the invention, internal partitions made of longitudinal walls extending in the front-rear direction are arranged on the left and right of the attaching portion, respectively.

According to the above structure, the inclined-direction load of the cross member can be smoothly transmitted in the X-shaped fashion to the inclined member through the internal partitions.

In one embodiment of the invention, the left and right outer shells of the attaching portion are provided with the longitudinal walls extending in the front-rear direction, respectively.

According to the above structure, the inclined-direction load of the cross member can be smoothly transmitted in the X-shaped fashion to the inclined member through the longitudinal walls.

In one embodiment of the invention, the rear portions of the left and right inclined portions of the inclined member are coupled to the vehicle body.

In the above structure, the inclined-direction load can be directly transmitted to the vehicle body without passing through the side member. Therefore, the transmission rigidity of the vehicle body to the inclined-direction load can be increased.

According to one embodiment of the invention, the opening is formed, which is surrounded by the cross member, the inclined member and the side member.

According to the above structure, since the portion other than the load transmission path can be eliminated by forming the opening, the weight of the front subframe can be reduced.

Further, since the surface area of the front subframe can be reduced, noises and vibrations of the front subframe can be reduced.

In one embodiment of the invention, the opening for inserting the link connected to the powertrain mount is formed in the attaching portion, the opening being arranged in the front surface located in the position not crossing the imaginary line connecting the left and right side edges of the front edge of the cross member and the portion coupled to the inclined member, and spaced rearward from the front edge, and the opening being spaced vertically from the front edge.

According to the above structure, since the opening is spaced vertically from the front edge of the cross member on which the load in the vehicle-width direction concentrates, the load in the vehicle-width direction can be transmitted without partially cutting the load on the front surface of the cross member by the opening. Accordingly, the structure is preferable in view of achieving the improvement of the load transmission rigidity with respect to the vehicle-width direction load of the cross member as well as the compacting in the front-rear direction.

In one embodiment of the invention, the cross member is provided, at the front surface thereof, with the bypass passage extending in the vehicle-width direction, and bypassing the front edge and located on the side opposite to the front edge, with the opening interposed therebetween.

According to the above structure, the load in the vehicle-width direction can be partially transmitted to the bypass passage, and thereby can be dispersed into the upper and lower portions of the opening. This can reduce the load applied to the portion between the opening and the front edge of the cross member, and consequently can increase the load transmission rigidity with respect to the load in the vehicle-width direction of the cross member.

This application is based on the Japanese patent application No. 2012-068880 filed on Mar. 26, 2012, and the contents thereof are contained in this application.

For representing the invention, the invention has been appropriately and sufficiently described throughout the embodiments with reference to the drawings. However, it is clearly understood that those skilled in the art can modify and/or improve the foregoing embodiments without difficulty. Accordingly, as long as the modification or improvement achieved by those skilled in the art does not attain the level which deviates from the claimed scope described in the claims, such modification or improvement is considered as it is contained in the claimed scope described in the claims.

Industrial Applicability

As described above, the invention is useful for the front subframe structure of the automobile provided with the attaching portion for the powertrain mount.

The invention claimed is:

1. A front subframe structure of an automobile comprising:
a pair of left and right side members extending in a vehicle front-rear direction;
a cross member of a closed cross-section structure extending in a vehicle-width direction to couple the a pair of left and right side members together;
an inclined member having a pair of left and right inclined portions extending obliquely, in a plan view, outward in a vehicle-widthwise direction and toward a rear of the vehicle from a rear portion of a vehicle-widthwise middle portion of the cross member; and
an attaching portion of a powertrain mount housed in the cross member and located behind a front edge of the cross member and in front of a coupling portion between the inclined member and the cross member, wherein
the attaching portion is formed of an expanded portion formed by expanding a vehicle-widthwise middle portion of the cross member rearward beyond rear edges of left and right side portions, and
the expanded portion is coupled to the inclined member.

2. The front subframe structure of an automobile according to claim 1, wherein
arm supports supporting arms of left and right suspensions are arranged on left and right ends of the cross member.

3. The front subframe structure of an automobile according to claim 2, wherein
the front edge of the cross member forms a vehicle-width direction load transmission path linearly connecting the left and right arm supports together, and
the attaching portion is arranged behind this path.

4. The front subframe structure of an automobile according to claim 2, wherein the left and right ends of the cross member extend obliquely outward and forward, the arm support includes front and rear supports, and the front support is arranged in front of the front edge of the cross member.

5. The front subframe structure of an automobile according to claim 1, wherein internal partitions made of longitudinal walls extending in the front-rear direction are arranged on the left and right of the attaching portion, respectively.

6. The front subframe structure of an automobile according to claim 1, wherein left and right outer shells of the attaching portion are provided with longitudinal walls extending in the front-rear direction, respectively.

7. The front subframe structure of an automobile according to claim 1, wherein rear portions of the left and right inclined portions of the inclined member are coupled to a vehicle body.

8. The front subframe structure of an automobile according to claim 1, wherein an opening is formed, which is surrounded by the cross member, the inclined member and the side member.

9. The front subframe structure of an automobile according to claim 1, wherein an opening for inserting a link connected to the powertrain mount is formed in the attaching portion, the opening being arranged in a front surface located in a position not crossing an imaginary line connecting left and right side edges of the front edge of the cross member and a portion coupled to the inclined member, and spaced rearward from the front edge, and the opening being spaced vertically from the front edge.

10. The front subframe structure of an automobile according to claim 9, wherein the cross member is provided, at the front surface thereof, with a bypass passage extending in a vehicle-width direction and bypassing the front edge and located on the side opposite to the front edge, with the opening interposed therebetween.

* * * * *